United States Patent [19]

Inoue

[11] Patent Number: 5,593,560
[45] Date of Patent: Jan. 14, 1997

[54] FLUID-FILTERING DEVICE FOR FILTERING OUT PARTICULATES IN FLUID

[76] Inventor: Noboru Inoue, 727 Funaki-cho, Ono-shi, Hyogo 675-13, Japan

[21] Appl. No.: 430,283

[22] Filed: Apr. 28, 1995

Related U.S. Application Data

[63] Continuation of Ser. No. 32,043, Mar. 16, 1993, abandoned.

[30] Foreign Application Priority Data

Mar. 16, 1992 [JP] Japan .................. 4-022959 U

[51] Int. Cl.⁶ .................. B01D 35/06; B03C 5/02
[52] U.S. Cl. .................. 204/671; 96/54; 96/59; 204/665; 204/674
[58] Field of Search .................. 204/302, 304, 204/305, 306, 307, 308, 572, 665, 666, 670, 671, 674; 210/243, 748; 96/54, 55, 58, 59

[56] References Cited

U.S. PATENT DOCUMENTS

| | | | |
|---|---|---|---|
| 3,398,982 | 8/1968 | Lochmann et al. | 204/302 |
| 3,770,605 | 11/1973 | McCoy | 204/188 |
| 3,928,158 | 12/1975 | Fritsche et al. | 204/188 |
| 4,350,590 | 9/1982 | Robinson | 210/243 |
| 4,406,672 | 9/1983 | Berz | 95/68 |
| 4,555,252 | 11/1985 | Eckstein | 96/67 |
| 4,623,365 | 11/1986 | Bergman | 96/58 |
| 4,666,599 | 5/1987 | Mihara | 210/243 |
| 4,744,910 | 5/1988 | Bossard | 210/748 |
| 4,941,962 | 7/1990 | Inoue | 204/302 |

FOREIGN PATENT DOCUMENTS

| | | |
|---|---|---|
| 1569868 | 6/1969 | France . |
| 2124215 | 9/1972 | France . |
| 9103432.9 | 3/1991 | Germany . |
| 50-119363 | 9/1975 | Japan . |

*Primary Examiner*—Bruce F. Bell
*Assistant Examiner*—William T. Leader
*Attorney, Agent, or Firm*—Armstrong, Westerman, Hattori, McLeland & Naughton

[57] ABSTRACT

A method of charging, coagulating, and filtering out particulates in a fluid. In this method, impurity particulates typified by coloring matter particulates can be efficiently removed without inducing clogging and without the need of maintenance for a long time. Also, a filter element used in this method and a fluid-filtering device are offered. The whole filtering layer of the filter element is made of a conductive layer having numerous voids passing the fluid, or the filter element has plural filtering layers of a conductive material. A filtering layer made of a conductive material is used as an electrically charging electrode.

5 Claims, 21 Drawing Sheets

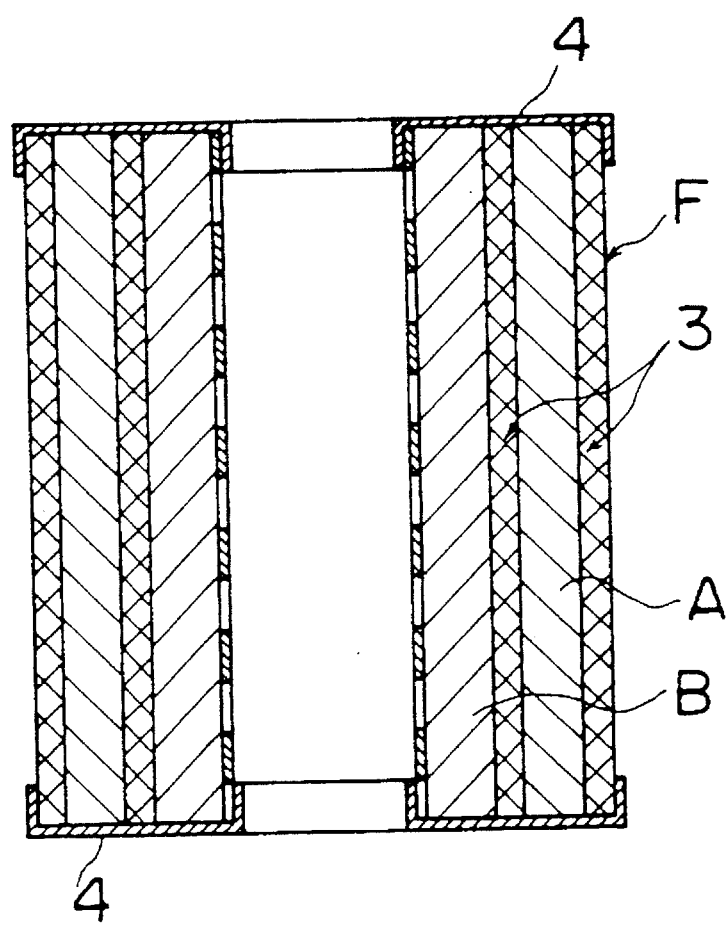

FLUID-FILTERING DEVICE FOR FILTERING OUT PARTICULATES IN FLUID

This application is a continuation application Ser. No. 08/032,043 filed Mar. 16, 1993, now abandoned.

FIELD OF THE INVENTION

The present invention relates to a method of electrically charging, coagulating, and filtering out particulates in a fluid, a filter element used in this method, and a fluid-filtering device and, more particularly, to techniques contributable to purification of gases such as air and other gases, purification of liquids such as water, oil, cleaning liquids, and machining liquids, i.e., techniques contributable to purification of the earth environment which has been required in recent years. More particularly, the invention relates to a method of electrically charging, coagulating, and filtering out particulates in a fluid, including coloring matter particles on the order of angstroms contained in wastewater, to a filter element used in this method, and also to a fluid-filtering device.

BACKGROUND OF THE INVENTION

Each microscopic particulate of dust in a fluid is electrically charged and has an electrical potential at the interface with the fluid. A known method of removing such dust particulates relies on the use of a zeta potential-applied filter element consisting of a filter coated with powder of barium titanate which has a natural potential when no external potential is applied; therefore, the filter itself has a potential. However, as this filter element is used, the coating material gradually flows out, so that the potential of the filter is gradually lost. As a result, the effective time of the filter is short. Consequently, it must be replaced frequently. This increases the cost.

In view of the foregoing situations, the present applicant has proposed a new apparatus in Japanese Utility Model Laid-Open No. 989113/1991. In particular, an inner cylindrical electrode is mounted inside an outer cylindrical electrode which acts also as a container of the body of the apparatus. The inner and outer electrodes are placed in the same potential and mounted in a coaxial relation to each other. A space through which a liquid to be processed circulates is formed between both electrodes. A filter having a porous metallic plate disposed directly on its outer surface is mounted in the space. The porous metallic plate is directly electrically charged to attract the interface potential (or, zeta potential) of each impurity particle in the liquid contained among the outer electrode, the inner electrode, and the porous plate by the Coulomb force so that the impurity particles may coagulate and form coarser particles. These coarser impurity particles are caught by the meshes of the filter mounted behind the porous plate to filter out the impurities in the fluid. In this apparatus, the potential for neutralizing the zeta potential is applied from the outside and so the potential on the surface of the filter will not be lost even after prolonged use of the apparatus.

However, in this apparatus, since the fluid is introduced into the filter via the porous metallic plate, the amount of inflow of the fluid into the filter depends on the porosity of the porous plate. Therefore, a limitation is imposed on the processed amount. Also, in this apparatus, the potential is applied only to the surface of the filter and so radially deep portions of the filter are not sufficiently electrically charged. Hence, the present situation is that impurity particles are collected at low efficiency in radially deep portions of the filter.

Furthermore, in the above-described apparatus, the radially deep portions of the filter are not electrically charged sufficiently and, therefore, the apparatus can be applied only to relatively large particles having sizes of about 10 microns. To coagulate particulates having smaller sizes, it is necessary to circulate the fluid through the filter many times. Consequently, the processing time is long.

In addition, where the above-described apparatus is used, if the efficiency at which impurity particles are coagulated to form coarser particles should be enhanced, the only one usable method is to increase the voltage for charging the filter. Especially in the DC electrical charging method, if the applied voltage is increased, the charging electrode undergoes electrolytic corrosion to thereby ionize the metallic electrode. For example, where an electrode made of a stainless steel is used, hexavalent chromium is produced. Therefore, it is difficult to process the wastewater. In consequence, limitations have been placed on increase in the applied voltage.

SUMMARY OF THE INVENTION

It is an object of the present invention to provide a method of electrically charging, coagulating, and filtering out particulates in a fluid in such a way that the fluid to be processed flows into the filter smoothly and that the fluid can be filtered in large amount, the method being further characterized in that it offers high filtering action without the need to apply a high voltage.

It is another object of the invention to provide a method of electrically charging, coagulating, and filtering out particulates in a fluid in such a way that the filter can be electrically charged deep to enhance the efficiency at which impurity particulates are caught, e.g., the method is capable of effectively filtering out microscopic impurity particulates on the order of angstroms typified by coloring matter particles.

It is a further object of the invention to provide a filter element that can be used in any of the methods described in the two preceding paragraphs.

It is a still other object of the invention to provide a fluid-filtering device incorporating the filter element described in the preceding paragraph.

In order to solve the problems with the foregoing prior art techniques, we have discussed the principle of the method of electrically charging, coagulating, and filtering out particulates in a fluid, and repeatedly conducted researches and experiments, based on the experience obtained heretofore. As a result, we have found a novel principle and a novel law as described below. The present invention has been made, based on these findings.

The principle of the method of electrically charging, coagulating, and filtering out particulates in a fluid has been understood as described below. According to an electrochemical theory, each particulate in a fluid possesses a phase boundary potential due to the zeta potential of an electrical double layer at the boundary with the fluid. The Coulomb force attributable to this phase boundary potential is exerted among the particulates. Thus, the particulates are afloat in the fluid while repelling each other. If some form of external energy is given to neutralize or reduce the phase boundary potential, then the repulsive force due to the Coulomb force decreases. As a result, the intermolecular attraction, or van der Waals force, which acts between particulates as a natural force becomes stronger than the repulsive force due to the Coulomb force. Consequently, the particulates attract each other and coagulate, forming coarser particles. Accurate filtering can be accomplished by passing the coarser particles through a filter whose meshes are such that the particles are caught. In this case, as the meshes are made rougher, clogging is less likely to occur. This prolongs the life of the filter and suppresses the running cost.

The filtering has been understood conceptually at this point. However, the relations among the parameters such as the relation between the applied voltage acting as an external energy source and the amount of energy imparted to each particulate by this voltage and the relation between the amount of energy and other parameter have not been understood. Therefore, it has been difficult to evaluate the important factors in designing the apparatus. Therefore, it has been difficult to propose an apparatus which has been improved, based on a unified theory.

After earnest discussions, we have found the relations among these parameters as follows.
Where the applied voltage is an AC voltage, $$G=Kmf^2a^2/\gamma^2 \quad (1)$$

Where the applied voltage is a DC voltage, $$G=Kma^2/\gamma^2 \quad (2)$$

where G is the total energy acting on a particulate, K is a constant, m is the mass of the particulate, f is the frequency of the AC current, a is a voltage or amplitude, and $\gamma$ is the distance between electrically charging electrodes.

The following evaluations can be made, based on these general formulas. We first discuss the case in which the applied voltage is an AC voltage. As can be seen from equation (1), if the other parameters are constant, as the mass m of the particulate is reduced, i.e., as the diameter of the particulate is reduced, the total energy G acting on the particulate decreases. This makes it more difficult to neutralize or reduce the phase boundary potential. Thus, it can be seen that particulates having smaller size can be coagulated with greater difficulty.

Since the total energy G is in proportion to square of the frequency f and to square of the voltage a in this formula, the neutralizing energy acting on the particulate can be increased logarithmically by increasing the frequency f and the voltage a. Coagulation and filtering of microscopic particulates can be attained by increasing the voltage a or the frequency f.

However, if the voltage a is made too large, a dielectric breakdown may occur. Also, the safety presents problems in handling the apparatus. Especially, where the applied voltage is a DC voltage, electrolytic corrosion tends to take place. For these reasons, the upper limit of the voltage a is set by the electrical resistance of the fluid. In the case of a water solution, the upper limit is 25 V/cm. In the case of oil, the upper limit is 500 V/cm. In air, the upper limit is about 10000 V/cm.

Also, limitations are imposed on increase in the frequency f. Experiment has shown that where the frequency exceeds 100 KHz, the current behaves mainly as electromagnetic wave and adversely affects the charging, coagulation, and filtering. Where the applied voltage is an AC voltage, an attracting force and a repulsive force alternately act on the particulate in the fluid because of the alternation in direction of the applied voltage. Hence, the energy acting herein can be defined as a vibrational energy.

The case in which the applied voltage is a DC voltage is discussed next. In this case, the general formula representing the total energy G is given by equation (2). Equation (2) is similar to equation (1) except that the parameter f, or the frequency, has been omitted. In this case, the force acting on the particulate and represented by the total energy G can be defined as a Coulomb force. As can be seen from equation (2), where the applied voltage is a DC voltage, the efficiency cannot be enhanced unless the voltage a is increased. Accordingly, where a DC voltage is applied, it is important to apply a high voltage. Therefore, to prevent the charging electrodes from being electrolytically corroded if such a high DC voltage is applied, the charging electrodes are made of a nonmetallic material.

In this way, where the applied voltage is an AC voltage, the frequency f and the voltage a are important factors which govern the total energy G. On the other hand, where the applied voltage is a DC voltage, the voltage a is an important factor. In addition, the charging electrode spacing $\gamma$ which is also an important factor affecting the total energy G is required to be discussed. As can be seen from equations (1) and (2), the total energy G is in inverse proportion to square of the charging electrode distance $\gamma$, which agrees with common knowledge in the theory of a force acting between two points. As mentioned above, limitations are imposed on increase in the total energy G where the frequency f and the voltage a are increased. In this case, it is important to increase the total energy G by adjusting the distance $\gamma$ between the charging electrodes.

Theoretically, the total energy G is increased by reducing the distance $\gamma$ between the charging electrodes. This will in turn enhance the efficiency at which particulates are coagulated to form coarser particles. However, limitations are imposed on reduction in the distance $\gamma$ because it is difficult to machine the apparatus.

In accordance with the present invention, instead of reducing the distance $\gamma$ between the charging electrodes, a filtering layer is formed from a conductive material. This filtering layer itself is used as a charging electrode. It substantially follows that the distance between the charging electrode and the particulate is made infinitely close to zero. By adopting these technical means in combination, the frequency f and the voltage a can be selected from reasonable ranges. This can increase the degree of freedom with which the apparatus can be designed.

We have also discussed general formulas for the total energy, taking account of the temperature t of the fluid, and have obtained the following equations. Where the applied voltage is an AC voltage, $$G=Kmf^2a^2t/\gamma^2 \quad (1')$$

Where the applied voltage is a DC voltage, $$G=Kma^2t/\gamma^2 \quad (2')$$

where G is the total energy acting on a particulate, K is a constant, m is the mass of the particulate, f is the frequency of the AC current, a is a voltage or amplitude, and $\gamma$ is the distance between electrically charging electrodes.

In equations (1') and (2'), the design factors of the mechanical structure of the apparatus are the frequency f, the voltage a and the distance $\gamma$ between the charging electrodes. The elements which are determined by the fluid are the mass m of the particulate and the temperature t of the fluid. That is, if the frequency f, the voltage a, and the distance $\gamma$ of the machine are constant, the total energy can be increased by elevating the temperature t of the fluid. As a result, particulates can be more readily coagulated.

A method of charging, coagulating, and filtering out particulates in a fluid has been completed, based on the theory described thus far. This novel method comprises the steps of: mounting an electrically charging electrode in a passage through which the fluid passes, the charging electrode being made of a conductive material, the charging electrode acting also as a filtering layer; mounting a counter electrode in the passage in an opposite relation to the charging electrode; applying a DC voltage between the charging electrode and the counter electrode to electrically charge the whole filtering layer so that a Coulomb force due to the DC voltage acts widely on particulates floating in the space between the charging electrode and the counter electrode in the fluid to coagulate the particulates, thus forming coarser particles; and forcing the coarser particles into the filtering layer along the flow of the fluid so that the particles may pass through the filtering layer, whereby the particulates in the fluid are filtered out.

Another method according to the invention comprises the steps of: applying an AC voltage between an electrically charging electrode and a counter electrode to electrically charge the whole filtering layer; and causing a vibrational energy produced by the AC voltage to act widely on particulates floating in the space between the charging electrode and the counter electrode in the fluid.

The filtering layer acting also as the charging electrode can take various shapes. For example, a cylindrical filter made of a conductive material can be used. A filter in which a conductive material is coaxially arranged and which assumes the form of a hollow container may also be employed. Furthermore, a flat filter made of a conductive material may be used. This flat filter can be immersed in the liquid within a tank previously installed. Additionally, a filtering layer acting also as a charging electrode can be formed, using a conductive adsorbent.

The present invention also offers a filter element used in the above-described method of charging, coagulating, and filtering out impurity particulates. This filter element is adapted to be placed in a passage through which a fluid to be filtered passes to filter out impurity particulates in the fluid, said filter element comprising: first filtering layers made of a conductive material having numerous voids passing the fluid; second filtering layers consisting of a dielectric material or an adsorbent and alternating with the first filtering layers; an upper sealing insulating packing member and a lower sealing insulating packing member which close the upper and lower ends, respectively, of the first and second filtering layers, the first filtering layers being used as electrically charging electrodes, whereby the filter element is electrically charged radially deep.

Instead of forming the whole filter element from a filtering layer made of a conductive material and acting also as a charging electrode, plural filtering layers made of a conductive layer and acting also as charging electrodes can be formed in the whole structure of the filter element. For example, filtering layers made of a conductive material and acting also as charging electrodes may alternate with filtering layers made of a dielectric material or an adsorbent.

The filtering layers of the conductive material can be formed from a conductive material having a large surface area such as carbon fibers and activated carbon. For example, the filtering layers can be formed by winding cords of carbon fibers on a bobbin or by winding cloth of carbon fibers in plural layers.

A filtering device using the filter element constructed as described above can comprise: an outer cylinder having an entrance port through which a fluid to be filtered is introduced; a central grounded electrode taking the form of a pipe, the electrode acting also as an outflow passage for the filtered fluid, the central electrode having the same polarity as the outer cylinder; a space formed between the outer cylinder and the central grounded electrode; and a filter element having a filtering layer acting also as an electrically charging electrode. The filtering layer is made of a conductive material and mounted in the space. A voltage according to the resistivity of the fluid is applied between the filter element and each of the outer cylinder and the central grounded electrode.

First, the principle of the novel method of charging, coagulating, and filtering out particulates in a fluid when the applied voltage is an AC voltage is described. Then, the principle of the method when the applied voltage is a DC voltage will be described next.

a) when the applied voltage is an AC voltage

As the applied voltage reverses in polarity, each particulate vibrates repeatedly. As the voltage a is increased, the amplitude of the vibration of each particulate increases. If the voltage a increases to some extent, it overcomes the repulsive force of the Coulomb force acting between particulates having the same polarity of phase boundary potential, so that the particulates come very close to each other. A strong intermolecular force acts between the particulates. As a result, the particulates are coagulated to form coarser particles. Since the AC voltage contains a DC component, this DC component cancels out the phase boundary potentials of the particulates. This promotes the coagulation and coarsening of particulates.

Since the frequency f is the number of repetition of the vibration, as the number increases, the phase boundary potentials are canceled out more frequently. Accordingly, as the frequency f increases, coagulation and coarsening of particulates are accelerated. As the mass m decreases, it is necessary to increase the voltage a or the frequency f. Especially, where limitations are imposed on the voltage a it is important to increase the frequency f, for obtaining an energy necessary to cancel out the phase boundary potentials.

As the distance $\gamma$ between the electrodes decreases, the electric field becomes stronger, and the energy imparted to each particulate increases. As each electrode is approached, the force which cancels out the phase boundary potential of the particulate increases. Therefore, in accordance with the present invention, the electrically charging electrode is made of a conductive material. It substantially follows that the distance between the electrodes is reduced infinitely close to zero. In AC charging, coagulation occurs within the electric field and near the charging electrode. Coagulated particulates are carried on the flow of the fluid and gathered on the surface of the filtering layer, thus creating a cake layer. This cake layer acts as a preliminary filtering layer. This prevents the body of the filtering layer from clogging. Also, the filtering accuracy is enhanced.

b) in the case of DC charging

Particulates having positive phase boundary potentials are attracted to the grounded electrode that is a negative electrode, by a Coulomb force and thus the particulates are collected. The positive phase boundary potentials of the particulates are neutralized at the surface of the grounded electrode, so that the particulates become electrically neutral. The particulates are attracted to each other by intermolecular attraction, coalesce, and coagulate. The coagulated particulates having no potential are carried by the flow of the fluid and collected at the surface of the charging electrode, thus creating a cake layer. This cake layer acts as a preliminary filtering layer, in the same way as in the case of AC charging.

The grounded electrode always attracts positive particulates by a Coulomb force and, therefore, the surface tends to be fouled at all times. In consequence, the surface is required to be cleaned at times.

On the other hand, particulates having negative phase boundary potentials are attracted to the surface of the filtering surface of a positive potential made of a conductive material by a Coulomb force and thus the particulates are collected. The phase boundary potentials are lost at the surface of the filtering layer. The particulates are attracted to each other by intermolecular attraction, so that they are coagulated. In this way, a cake layer is formed on the surface of the filtering layer. The fluid is passed through the voids in the cake layer and filtered. Particulates having negative phase boundary potentials are efficiently filtered out, because adsorption filtering acts also on them, i.e., they are constantly attracted to the positive potential of the filtering layer by a Coulomb force and gathered.

Where the charging electrode acting also as a filtering layer is made of a nonmetallic conductive material, outflow of harmful metal ions due to electrolytic corrosion does not occur. In this case, a considerably high voltage can be used as the applied voltage. Therefore, it is possible to increase the applied voltage up to the level where the neutralization of the phase boundary potential is effectively done. Hence, even ultramicroscopic particles such as coloring matter particles on the order of angstroms can be removed.

Where a water solution is to be processed, if a high voltage is applied, a large amount of hydrogen gas is produced from the negative electrode, while a large amount of oxygen gas is produced from the positive electrode because of electrolysis of the water solution. Therefore, separate measures must be taken to eliminate the possibility that the mixture gas of hydrogen and oxygen catches fire and explodes.

A specific example of the filter element constructed based on the above-described principle filters a fluid in the manner described now. Impurity particulates in the fluid flowing into the filter element pass through the filtering layer acting also as the charging electrode, the filtering layer having numerous voids passing the fluid. When the fluid is passing through the filtering layer, the impurity particulates are directly attracted by a Coulomb force created by the voltage applied directly to the filtering layer, and are caught in the filtering layer. The conductive material is formed in plural layers over the whole filter element or in the element. Therefore, the whole filtering layer is electrically charged, or a wide range of the filtering layer is electrically charged. Thus, throughout the whole process of passage of the fluid through the filter, a strong Coulomb force acts on the fluid. Hence, impurity particulates can be caught efficiently even in deep portions of the filter. Since the impurity particulates are caught by the Coulomb force, impurity particulates much smaller than the meshes of the filtering layer made of the conductive material can be caught efficiently.

In addition to the direct attractive action of the Coulomb force, the action of the electric field cancels out the zeta potential of each impurity particulate. This promotes coagulation and coarsening of impurity particulates. As a result, the filtering layer can catch impurity particulates with greater ease.

Especially, where the filtering layer acting also as the charging electrode is made of a conductive material having a large surface area such as carbon fibers or activated carbon, all of close microscopic surface portions contribute to the function of the charging electrode. In consequence, impurity particulates in the processed fluid can be caught efficiently.

In addition, a large amount of fluid can be processed efficiently, because substantially innumerable spaces passing the fluid are formed between the fibers or in activated carbon.

In a filtering device incorporating such a filter element, the fluid to be processed is introduced from the entrance port formed in the outer cylinder and passed through the filter element radially inwardly, whereby impurity particulates in the fluid are removed. The filtered fluid is discharged from the device through the discharge port formed at one end of the pipe-like electrode acting also as the grounded electrode.

Other objects and features of the invention will appear in the course of the description thereof which follows.

BRIEF DESCRIPTION OF THE DRAWINGS

FIG. 7 is a cross-sectional view of a filter element having a plurality of filtering layers made of a conductive material;

DETAILED DESCRIPTION OF THE INVENTION

The manner in which particulates are coagulated to form coarser particles by the novel method of charging, coagulating, and filtering out particulates is described next by referring to the accompanying drawings.

In the case of DC charging

Figure 1:
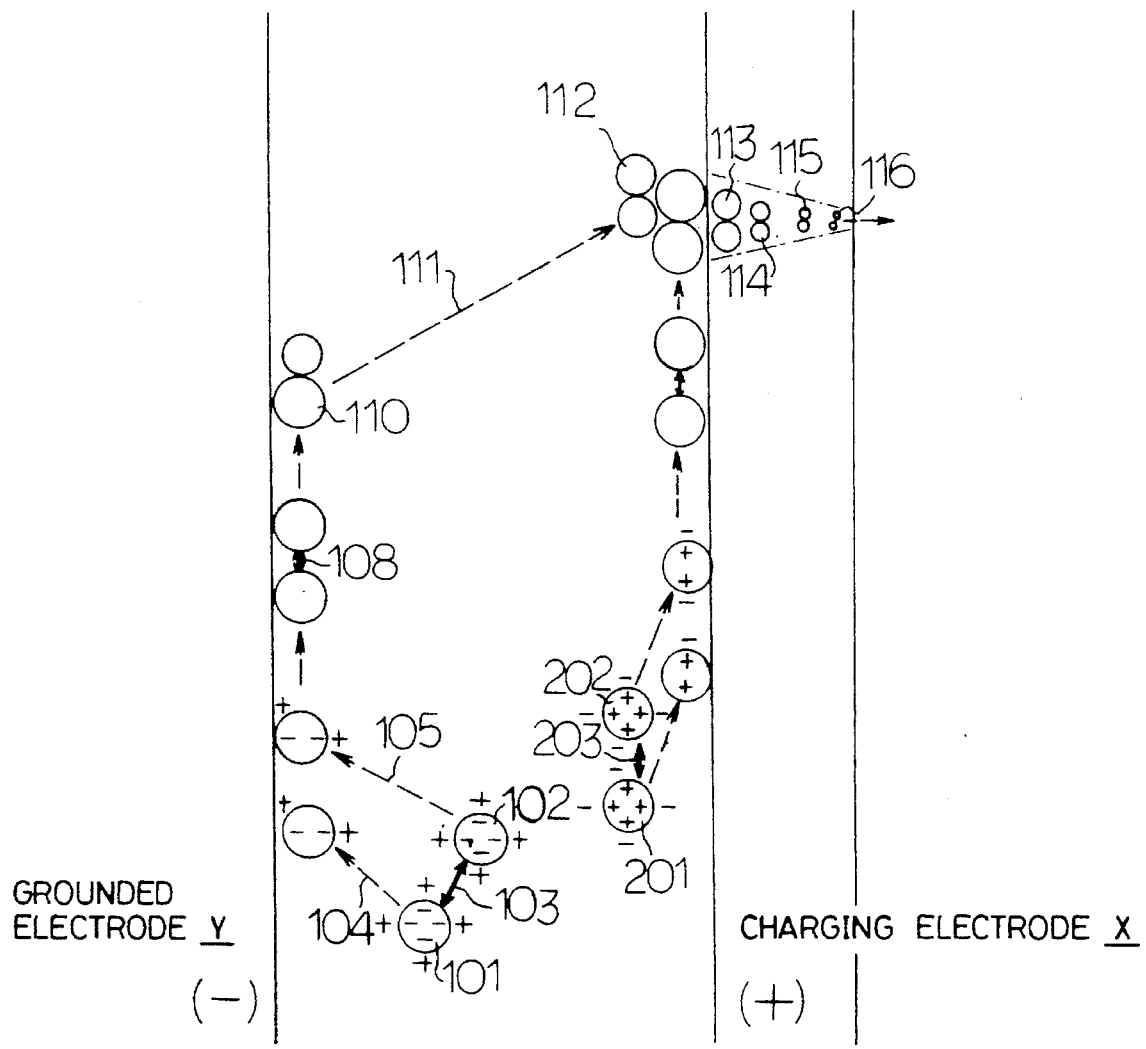
FIG. 1 is a conceptual diagram illustrating the coagulation process of particulates when a DC voltage is applied in accordance with the present invention.

FIG. 1 illustrates the process of coagulation and coarsening of particulates in the case of a DC charging. X indicates an electrically charging electrode. Y indicates a grounded electrode. The charging electrode X is made of a conductive material provided with numerous voids through which fluid passes. The charging electrode X acts also as a filtering layer.

Particulates 101 and 102 have positive phase boundary potential. A repulsive force produced by a Coulomb force acts between the particulates 101 and 102 as indicated by the arrows 103. When a DC voltage is applied between the charging electrode X and the grounded electrode Y to exert an electric field on the particulates 101 and 102, they are attracted to the grounded electrode Y having a negative potential by the Coulomb force in the directions indicated by the arrows 104 and 105, respectively. They are gathered on the surface of the grounded electrode Y. The positive potential of the particulates 101 and 102 are neutralized by the negative potential of the grounded electrode Y, and then the particulates are attracted to each other by the intermolecular force indicated by the arrow 108. Thus, they are coagulated as indicated by 110. The particulates which have been coagulated to form coarser particles in this manner are carried on the flow of fluid indicated by 111 and moved toward the charging electrode X. Thereafter, the particles gather on the surface of the charging electrode X as indicated by 112.

On the other hand, particulates 201 and 202 having negative phase boundary potential are attracted by the positive potential of the charging electrode X and gathered on the surface of the charging electrode X. The negative phase boundary potential of the particulates 201 and 202 are neutralized by the positive potential of the charging electrode X. Then, the particulates 201 and 202 which are presently electrically neutral are coagulated by the intermolecular force 203, and collected on the surface of the charging electrode X.

In this way, the particulates 101, 102 having positive phase boundary potential and the particulates 201, 202 having negative phase boundary potential are all collected on the surface of the charging electrode X while coagulated to form coarser particles. Whether the phase boundary potential of each particulate floating in a fluid is positive or negative depends on the nature of the fluid and also on the kind of the impurity particulate. Frequently, particulates having positive phase boundary potential and particulates having negative phase boundary potential are mixed.

The coagulated particulates on the surface of the charging electrode X enter the charging electrode X along the flow of the fluid, the charging electrode acting also as a filtering layer. Portions of the coagulated particulates deposit on the surface of the electrode X, creating a cake layer 112. Coagulated particulates which subsequently flow into the filtering layer, or the charging electrode X, pass through the cake layer formed on the surface of the charging electrode X, whereby the particulates are preliminarily filtered out. Then, the particulates entering the filter layer, or the charging electrode X, pass through the meshes of the filtering layer and go deep through the filtering layer. As indicated by 113, 114, 115, and 116, the grain size of the coagulated particulates passing through the meshes is gradually reduced. The filtering layer, or the charging electrode X, is made of a conductive material and entirely electrically charged. Therefore, the coagulated particulates passing through the filtering layer create a cake layer also inside the filtering layer. This contributes to an improvement in the filtering accuracy.

In this way, the particulates are eventually coagulated and filtered out by the filtering layer, whether the phase boundary potential of each particulate is positive or negative. As mentioned above, particulates having positive phase boundary potential are constantly attracted to the grounded electrode Y that is a negative electrode, and the particulates coagulated and made coarser on the surface of the grounded electrode Y are carried along the flow of the fluid toward the charging electrode X. However, some particulates do not move away from the surface of the grounded electrode Y but remains on the surface, thus contaminating the surface of the grounded electrode Y. Therefore, it is necessary to clean the surface of the grounded electrode Y periodically.

In the case of AC Charging

Figure 2:
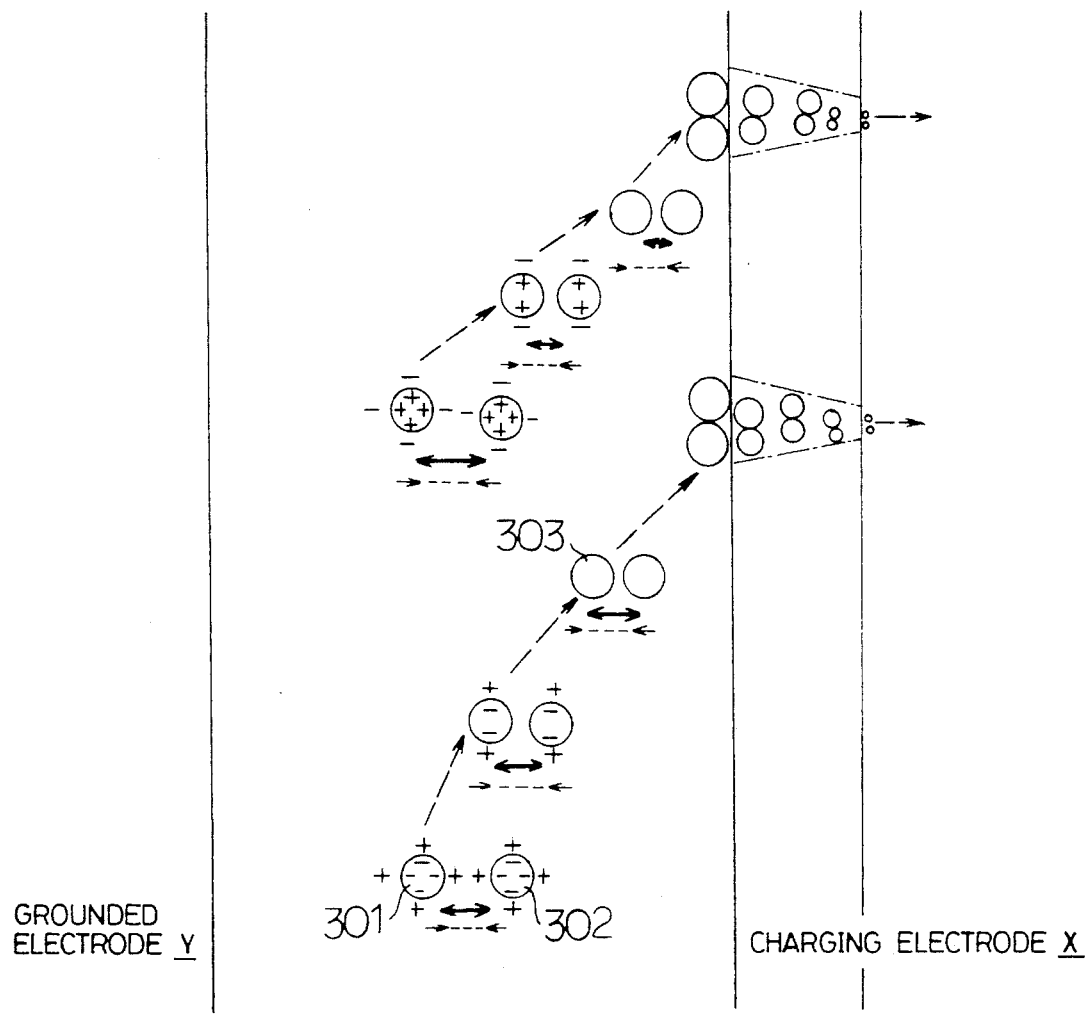
FIG. 2 is a conceptual diagram similar to FIG. 1, but in which an AC voltage is applied.

FIG. 2 illustrates the process of coagulation and coarsening of particulates in the case of AC charging. In the same way as the above-described case of DC charging, X indicates an electrically charging electrode, and Y indicates a grounded electrode. Since the polarity reverses at all times in the case of AC charging, the potentials and the polarities of the electrodes are varying constantly.

In AC charging, a force acts between particulates 301 and 302 in such a way as to reduce the distance between them by the vibrational energy determined by the frequency and the voltage of the charging power supply, irrespective of the polarities of the phase boundary potentials of the particulates 301 and 302. If the distance between the particulates decreases below a given value, the intermolecular force increases suddenly. As a result, the intermolecular attraction becomes larger than the repulsive force produced by a Coulomb force, whereby the particulates coagulate. Accordingly, as indicated by 303, particulates are coagulated at positions remote from the charging electrode X and from the grounded electrode Y. Since the AC voltage contains a DC component, the phase boundary potentials of close particulates are neutralized.

The coagulated particulates are carried on the flow of the fluid, moved toward the filtered layer, or the charging electrode X, and filtered out while creating cake layers on and inside the surface of the filtering layer, in the same way as in the case of DC charging.

In the novel method of charging, coagulating, and filtering out particulates, the particulates in the fluid behave as described above. Filter elements and fluid-filtering devices built, making use of the inventive theory, are described below.

Figure 3:
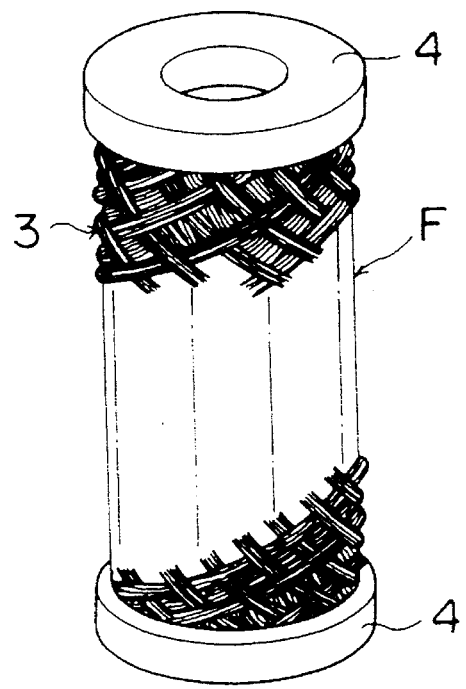
FIG. 3 is a perspective view in cross section of a filter element according to the invention.
Figure 4:
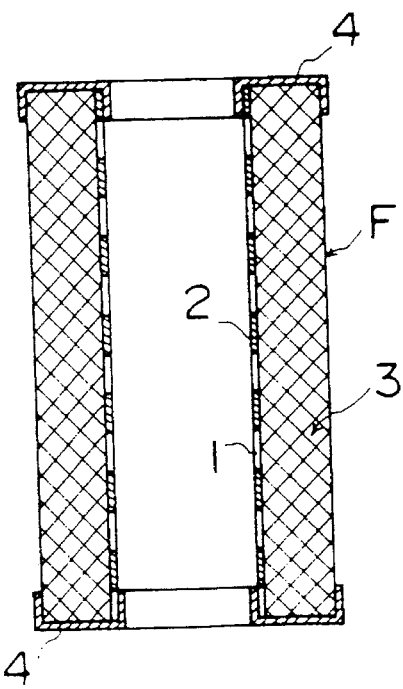
FIG. 4 is a cross-sectional view of the filter element shown in FIG. 3.
Figure 5A:
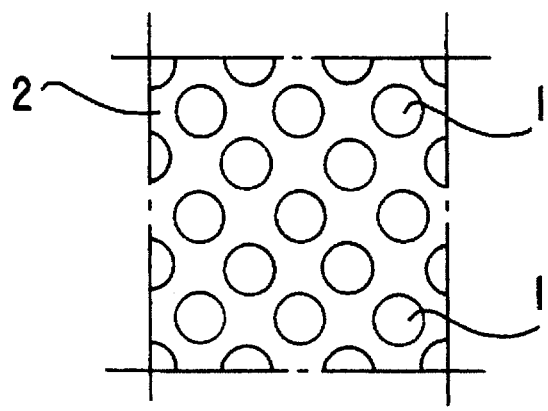
FIGS. 5A and 5B, are fragmentary enlarged views of modifications of the core of the filter element shown in FIGS. 3 and 4.
Figure 5B:
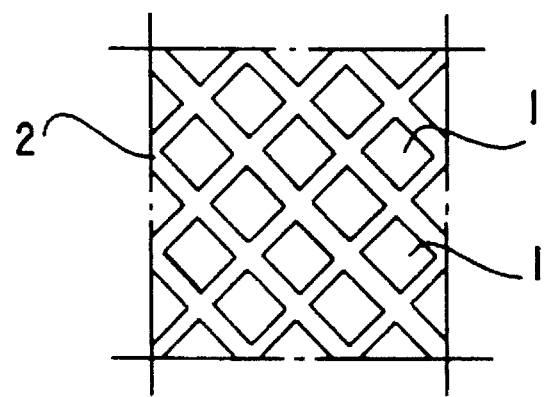

FIG. 3 is a perspective view of a filter element according to the invention. FIG. 4 is a cross-sectional view of this filter element. This filter element, generally indicated by F, comprises a core 2 provided with numerous holes 1 for passing fluid, a conductive filtering layer 3 formed by winding cord-shaped or threadlike carbon fibers on the core 2, an upper ring 4, and a lower ring 4. The rings 4 are mounted at the upper and lower ends, respectively, of the filtering layer 3, and act also as sealing members. The core 2 and the rings 4 of insulating packing are made of polypropylene or other synthetic resin which is excellent in corrosion resistance and chemical resistance. Although the core 2 is normally made of a synthetic resin, if the insulation presents no problems when the filter element F is incorporated in a filtering device, the core 2 may also be made of a metal. The core 2 may be a cylinder whose surface is provided with numerous holes as shown in FIG. 5A. Alternatively, the core 2 may consist of net as shown in FIG. 5B.

Figure 6A:
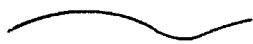
FIG. 6A is a side elevation of thread that is one of the materials of the filtering layer consisting of a conductive material.
Figure 6B:
FIG. 6B is a side elevation of a cord forming one of the materials of the filtering layer.
Figure 6C:
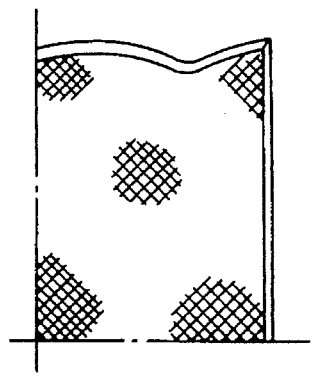
FIG. 6C is a front elevation of a sheet forming one of the materials of the filtering layer.
Figure 6D:
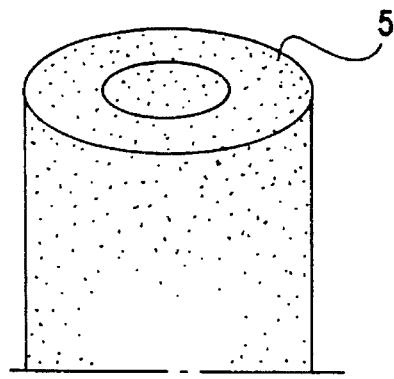
FIG. 6D is a perspective view of a cylinder from which a filtering layer according to the invention can be formed.

The fibrous conductive material of the filtering layer is not limited to carbon fiber. As described above, threadlike (FIG. 6A) or cord-shaped (FIG. 6B) fibrous material can be wound on the core 2. As shown in FIG. 6C, a fibrous material taking the form of cloth, net, or sheet can be wound on the core 2. Furthermore, a cylinder 5 as shown in FIG. 6D can be formed directly by compressing molding out of carbon fibers or the like, and this cylinder 5 can be utilized. Additionally, the material of the filtering layer is not restricted to fibrous conductive materials. For instance, sintered metals, porous conductive ceramics, and activated carbon having relatively large porosity may also be used. Meshes of the filter element fabricated in this way are set to about 25 to 50 μm, which is larger than the meshes of the filter element used in the prior art device and much larger than impurity particles to be filtered out.

FIG. 7 shows another filter element, indicated by F. In this filter element, filtering layers 3 acting also as charging electrodes are made of a conductive material and alternate with filtering layers A and B. For example, the filtering layer A consists of an adsorbent such as activated carbon or an ion-exchange resin. The filtering layer B can consist of a dielectric material using dielectric fibers. The filtering layers 3 made of the conductive material are electrically connected together by a conductive material (not shown) and placed at the same potential. The specific structure of the filtering layers A and B is not limited to the above-described structure. The positions of the filtering layer of the adsorbent and of the filtering layer of the dielectric material may be interchanged. Furthermore, the filtering layers A and B may both be made of an adsorbent or a dielectric material.

Figure 8A:
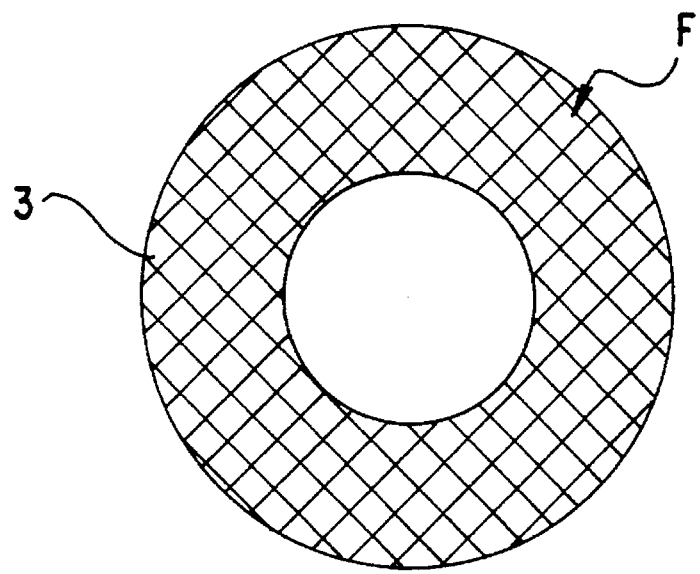
FIG. 8A is a horizontal cross section of another filter element according to the invention.
Figure 8B:
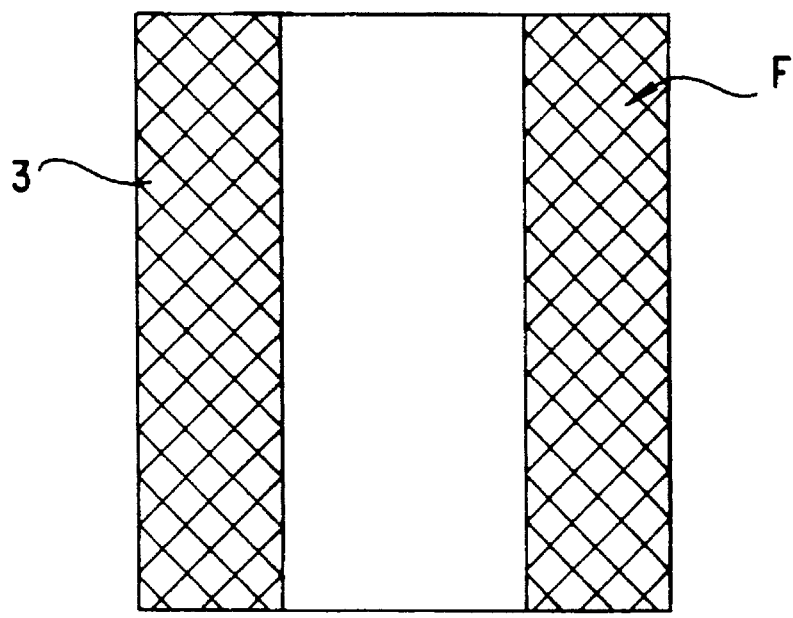
FIG. 8B is a vertical cross section of the filter element shown in FIG. 8A.

Referring next to FIG. 8, A and B, there is shown another filter element which is similar to the filter element shown in FIG. 4 except that the core has been omitted. The element is entirely composed of a filtering layer 3 made of a conductive material, in the same way as the filter element shown in FIG. 4.

Figure 9A:
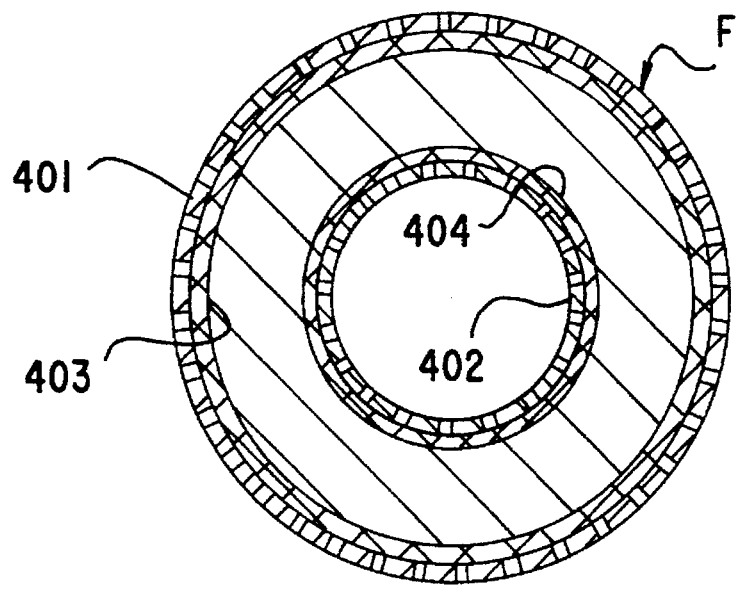
FIG. 9A is a horizontal cross section of a further filter element according to the invention.
Figure 9B:
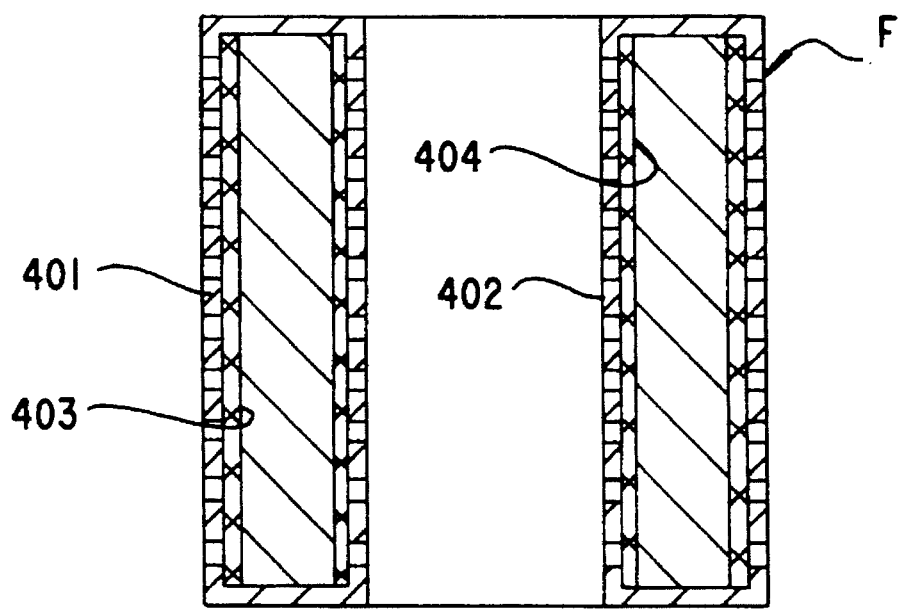
FIG. 9B is a vertical cross section of the filter element shown in FIG. 9A.

Referring next to FIG. 9, A and B, there is shown a disposable filter element. This filter element, generally indicated by F, comprises an outer cylinder 401, an inner cylinder 402, an outer filtering layer 403 formed on the inner surface of the outer cylinder 401, an inner filtering layer 404 formed on the outer surface of the inner cylinder 402, and an adsorbent 405 filling the inner space between the outer filtering layer 403 and the inner filtering layer 404, thus forming a disposable package. The outer cylinder 401 and the inner cylinder 402 are each made of a porous plate made of a conductive material. The filtering layers 403 and 404 are made of a conductive material and have a given thickness.

Figure 10A:
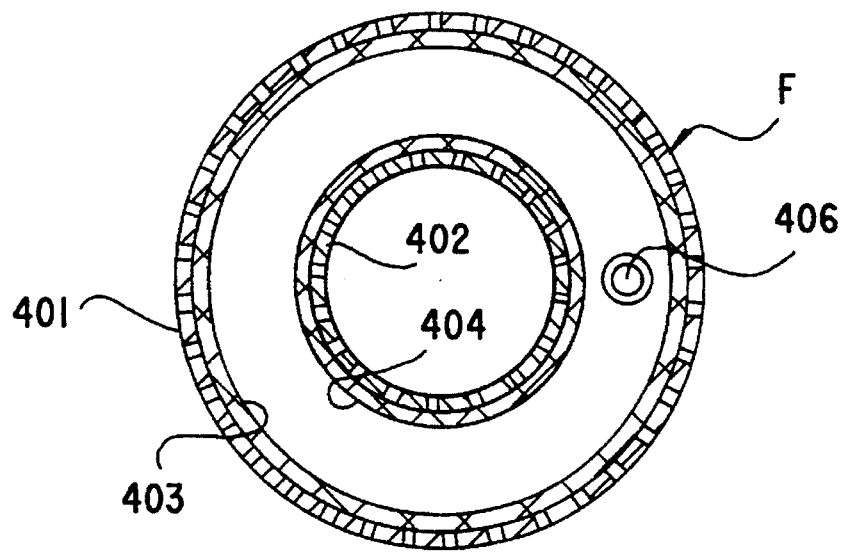
FIG. 10A is a horizontal cross section of a still other filter element according to the invention.
Figure 10B:
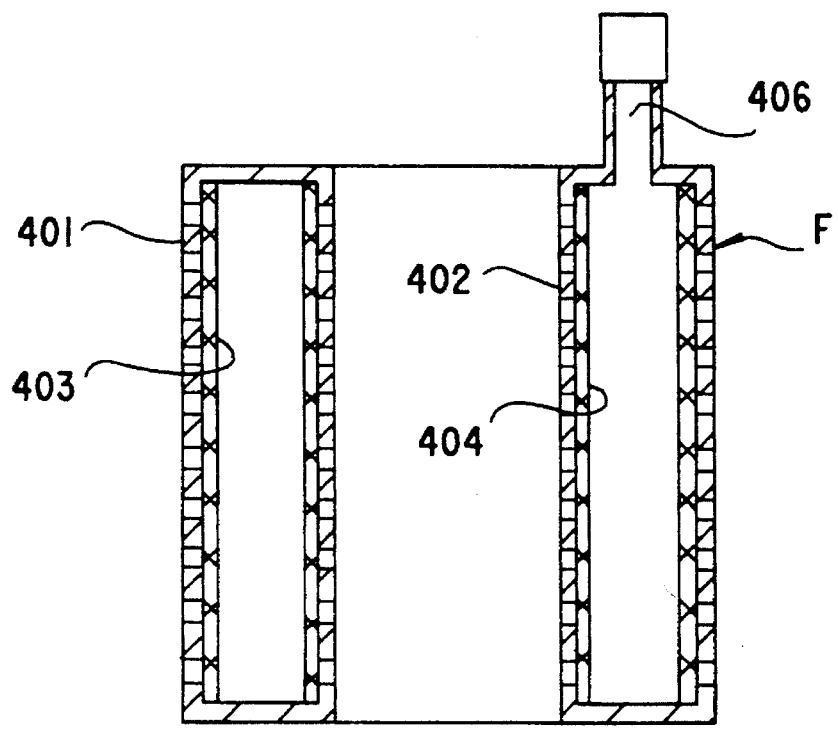
FIG. 10B is a vertical cross section of the filter element shown in FIG. 10A.

Referring to FIG. 10, A and B, there is shown a further filter element. This filter element, generally indicated by F, consists of a coaxial hollow container comprising an outer cylinder 401, an inner cylinder 402, an outer filtering layer 403 formed on the inner surface of the outer cylinder 401, and an inner filtering layer 404 formed on the outer surface of the inner cylinder 402. The outer cylinder 401 and the inner cylinder 402 are each made of a porous plate made of a conductive material. The filtering layers 403 and 404 are made of a conductive material and have a given thickness. An entrance port 406 is formed at the upper end surface of the filter element F. A contaminated fluid is forced into the space inside the element F through the entrance port 406. The fluid passed through the outer cylinder 401 and the inner cylinder 402 is discharged to the outside.

Figure 11:
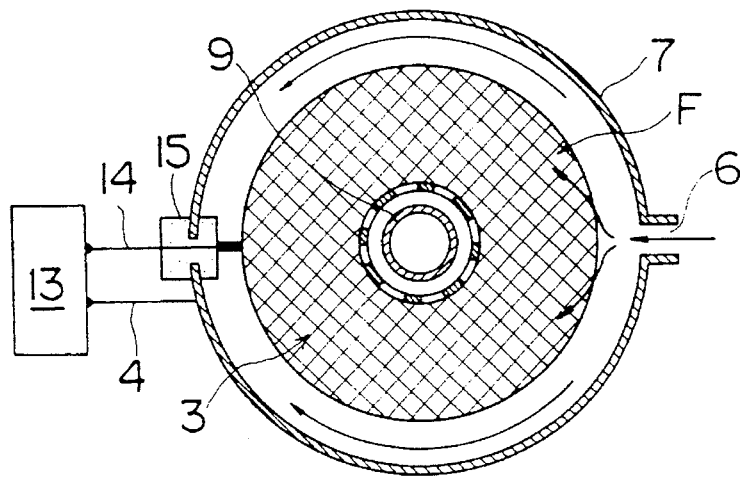
FIG. 11 is a horizontal cross section of a fluid-filtering device according to the invention.
Figure 12:
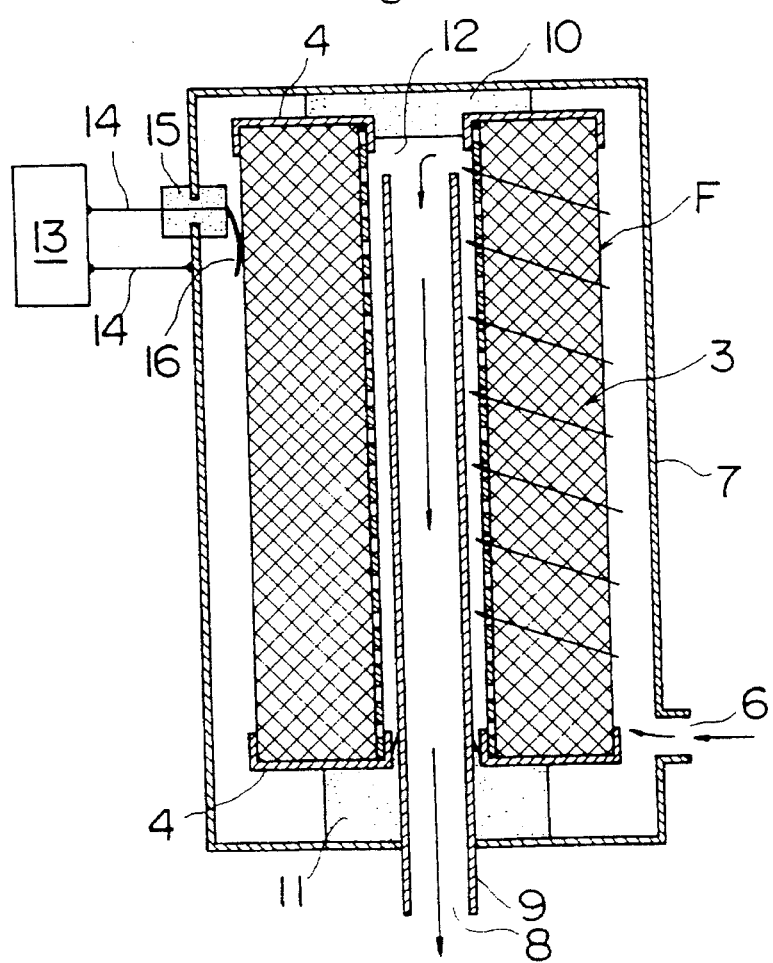
FIG. 12 is a vertical cross section of the fluid-filtering device shown in FIG. 11.

The filter elements F constructed as described above are mounted in filtering devices and used. FIGS. 11 and 12 show the most fundamental structure of a filtering device incorporating a filter element F which is of the same kind as the filter element shown in FIGS. 3 and 4. The filtering device comprises an outer cylinder 7 and a central grounded electrode 9. The outer cylinder 7 is provided with an entrance port 6 through which a fluid to be filtered is introduced. The grounded electrode 9 takes the form of a pipe and acts also as a discharge passage for the filtered fluid. The grounded electrode 9 has a discharge port 8 at its lower end. The element F is loaded in the space between the outer cylinder 7 and the central grounded electrode 9, the fluid being caused to pass through the space. The filter element F is removably mounted in position by holding an upper insulating packing member 4 and a lower insulating packing member 4 with an upper filter holder 10 and a lower filter holder 11, respectively. The holders 10 and 11 are made of an insulating material. Since the insulating packing members 4 are mounted at the upper end and at the lower end, respectively, of the filter element, creation of a gap among the upper filter holder 10, the lower filter holder 11, and the filter element F can be completely prevented. In order that the fluid go out of the device through the discharge port 8 and through the central grounded electrode 9, the fluid must pass through the filter element F. The entrance port 6 is formed near the bottom of the outer cylinder 7. An opening is formed at the upper end of the grounded electrode 9. When the fluid is introduced from the entrance port 6 under pressure from a pump or the like, the fluid passes through the filter element F upwardly, reaches the opening 12 at the upper end of the central grounded electrode 9, passes through the grounded electrode 9, and goes out of the device through the discharge part 8 formed at the bottom of the grounded electrode 9. In this way, a bypass passage is formed.

The outer cylinder 7 and the central grounded electrode 9 are placed at the same potential. On the other hand, a potential is applied to the filter element F. For this purpose, lead-in wires 14 extend from an externally installed, charging power supply 13. One of the lead-in wires 14 is connected with the outer cylinder 7. The other is introduced into the outer cylinder 7 while electrically isolated from the outer cylinder via an insulator 15. A charging spring 16 is pressed against the surface of the filter element F. In this way, a potential is impressed on the whole filter element via the spring 16.

The kind of the applied voltage and the amplitude are appropriately selected, depending on the kind of the processed fluid and on the kind of the impurity particles to be removed. For example, a DC or AC voltage of 0.1 to 5000 V/cm or a combination of a DC voltage and an AC voltage can be adopted. Each particulate in a fluid is electrically charged positively or negatively, depending on the nature of the fluid and on the nature of the particulate itself. Also, the phase boundary potential, or the zeta potential, differs according to the resistivity of the fluid. Therefore, it is necessary to determine the value of the charging voltage and the polarity according to the nature of the fluid and the nature of the particulate. The sign can be switched between positive and negative, using a switch. The voltage can be adjusted with a rheostat.

In the filter device of this construction, the fluid to be processed is forced into the filter device from the entrance port 6 near the bottom of the outer cylinder 7, using a pump or the like. The fluid introduced from the entrance port 6 passes through the filter element F upwardly, reaches the opening 12 at the upper end of the central grounded electrode 9, flows downwardly inside the grounded electrode 9, and leaves the device from the discharge port 8 at the bottom of the grounded electrode 9.

Since the filter element F consists entirely of a fibrous conductive material such as carbon fibers, the whole element is at the same potential. Impurity particulates in the fluid passing through the filter element are strongly directly attracted to the element F by a Coulomb force and caught by the carbon fibers forming the filter element F. Since particulates are attracted by the Coulomb force, particulates which are much smaller than the meshes of the filter element such as carbon black particles of about 0.1 µm in diameter and coloring matter particles on the order of several angstroms can be caught. Because the caught particulates are much smaller than the meshes, the filter element can act as a filtering layer for a long time without clogging. Those particulates which are electrically attracted to the filter element are placed at the same potential as the filter element. The electrically charged layer of the adhering particulates forms a precoat layer, or a cake layer. It substantially follows that the meshes are reduced in size. The filtering accuracy is enhanced. These advantages can also be had where activated carbon is used.

The particulates are directly attracted by the Coulomb force. In addition, the electric field acting on the particulates cancels out the zeta potential of the particulates. As a result, intermolecular force promotes the coagulation and coarsening of the particulates. Hence, the particulates are caught more efficiently.

In the present example of fluid-filtering device, the whole filter element acts as a filtering layer and also as a charging electrode. The filter element is entirely at the same potential. Therefore, the fluid passing through the filter element undergoes attractive action created by a Coulomb force. Furthermore, the filter element is made up of carbon fibers. Microscopically, innumerable threadlike fibers gather in close proximity. These fibers exert electrical attractive force on impurity particulates in the fluid from quite short distances. In consequence, the filtering accuracy is quite high. Additionally, almost innumerable spaces through which the fluid passes are formed between the adjacent fibers. Consequently, a large amount of fluid can be processed with a high efficiency.

Since impurity particulates are caught by the Coulomb force, the meshes of the filter can be made much larger than the size of the impurity particulates. In this way, a fluid-filtering device which exhibits an excellent filtering accuracy, does not easily clog, and has a long life can be obtained. If the filter element is clogged up after a long continuous use, it suffices to exchange only the filter element.

Figure 13:
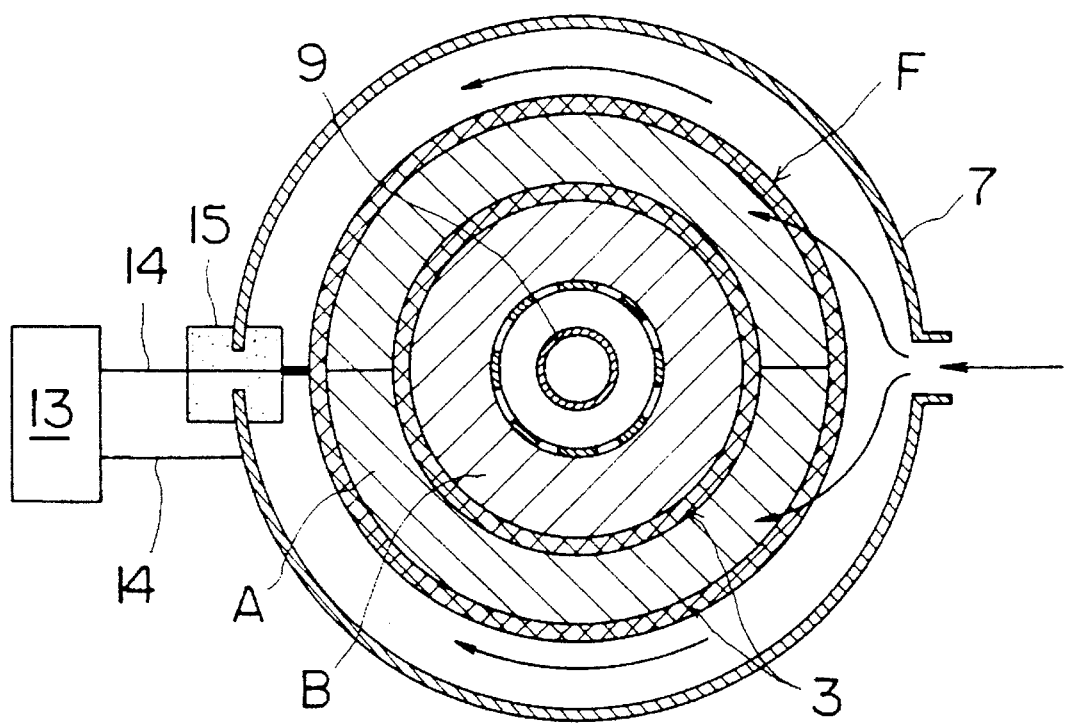
FIG. 13 is a horizontal cross section of another fluid-filtering device according to the invention.
Figure 14:
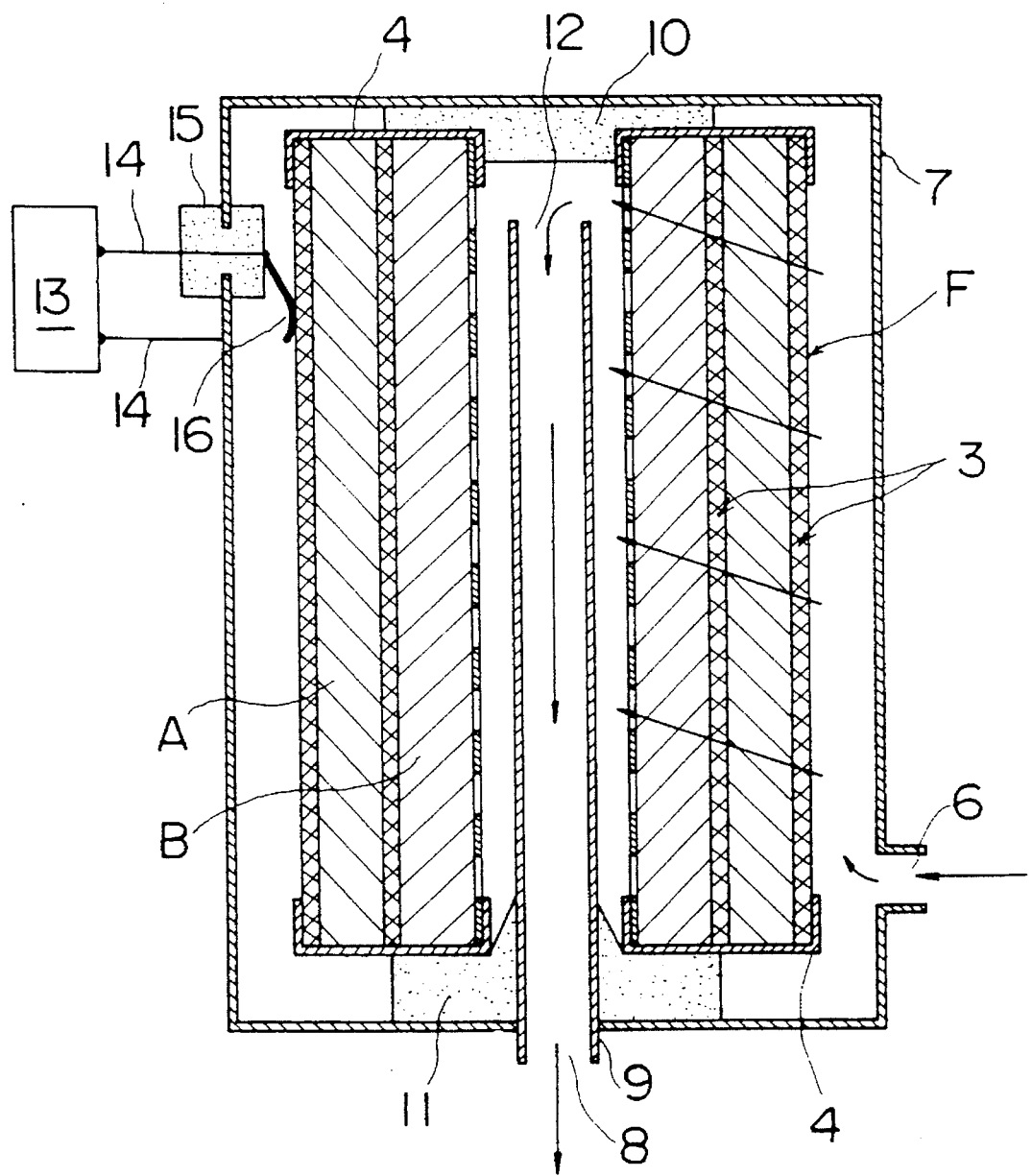
FIG. 14 is a vertical cross section of the fluid-filtering device shown in FIG. 13.

Referring to FIGS. 13 and 14, there is shown a filtering device incorporating the same kind of filter element F as the filter element shown in FIG. 7. The filter element F of this device comprises filtering layers 3 made of a conductive material, a filtering layer A located between the filtering layers 3, a core 2, and a filtering layer B located between the inner filtering layer 3 and the core 2. The filtering layers 3 act also as charging electrodes. The filtering layer A consists of an adsorbent such as activated carbon or an ion-exchange resin. The filtering layer B is made of dielectric materials such as dielectric fibrous threads. In this filtering device, the Coulomb force produced by the filtering layers 3 acting also as the charging electrodes attracts impurity particulates. At the same time, activated carbon adsorbs impurity particulates on a molecular level. The dielectric substance forming the filtering layer B is polarized within an electric field and acts like a capacitor. Hence, the dielectric substance behaves like a number of electrodes.

Figure 15:
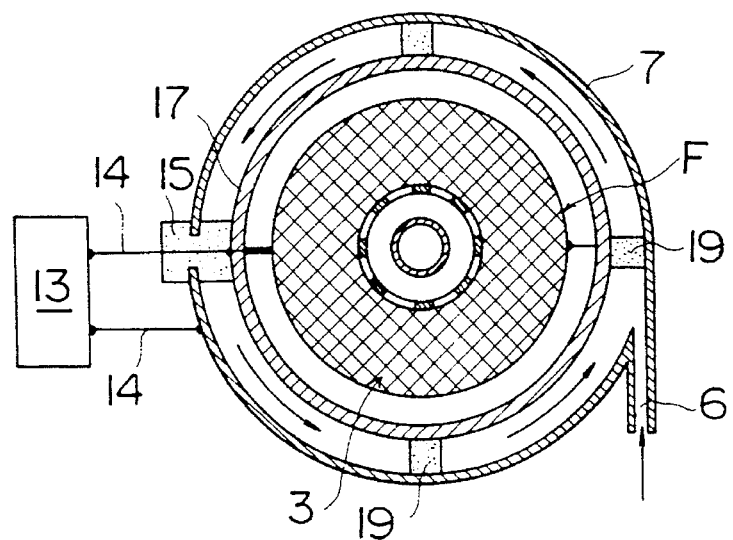
FIG. 15 is a horizontal cross section of a further fluid-filtering device according to the invention.
Figure 16:
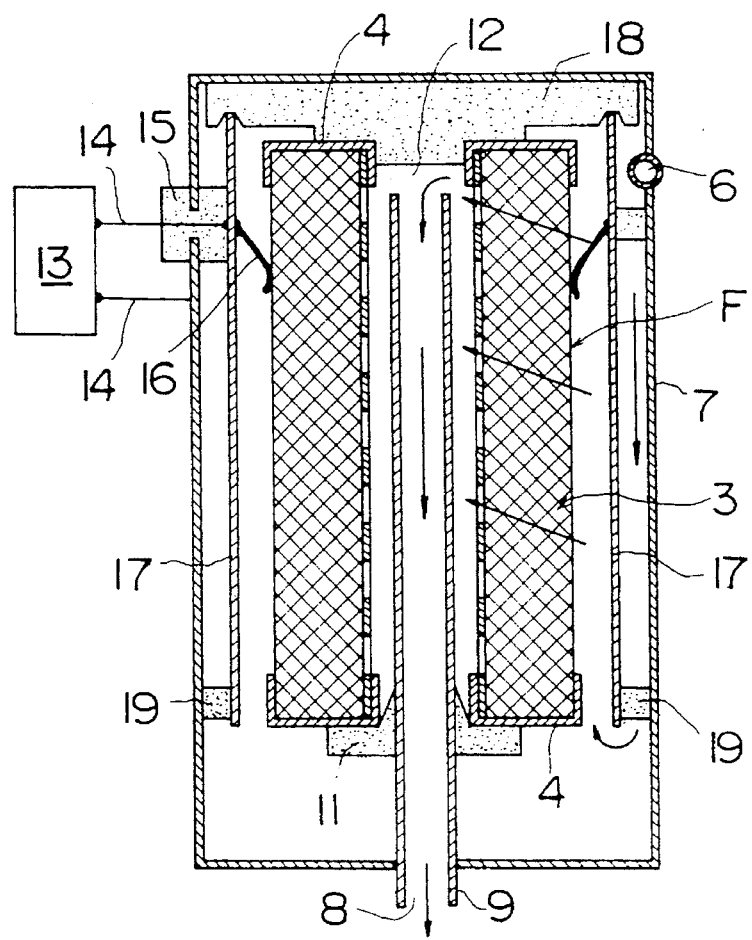
FIG. 16 is a vertical cross section of the fluid-filtering device shown in FIG. 15.

FIGS. 15 and 16 show a practical example of the filtering device shown in FIGS. 11 and 12. In this example, an electrically charging plate 17 acting also as a partitioning plate is coaxially mounted between the outer cylinder 7 and the filter element F. The upper end of the charging plate 17 is held by a side stream-preventing plate 18. The lower end is mounted to the outer cylinder 7 by an insulator 19. The side stream-preventing plate 18 is made of an insulating material and acts also as an upper filter holder. This device is so designed that the fluid entering from the entrance port 6 formed near the top of the outer cylinder 7 is once passed downwardly through the space between the outer cylinder 7 and the charging plate 17, then is passed through the filter element F upwardly, and reaches the opening 12 at the upper end of the central grounded electrode 9. The side stream-preventing plate 18 supports the upper end of the charging plate 17 and closes the upper space of the charging plate 17; otherwise the fluid entering from the upper position of the outer cylinder would pass over the charging plate 17 and directly enter the filter element F.

In this fluid-filtering device, the fluid introduced into the device from near the top of the outer cylinder 7 tangentially of the cylinder 7 under the pressure from the pump is passed through the space between the outer cylinder 7 and the charging plate 17 while rotating the space, the charging plate 17 acting also as a partitioning plate. Particulates are coagulated to form coarser particles. The coagulation is promoted by the centrifugal force and by the action of the electric field. The coarser particles are settled. In this way, before passing through the filter element F, the particulates are made coarser. This alleviates the burden on the filter element F and prolongs the life of the element F.

Figure 17:
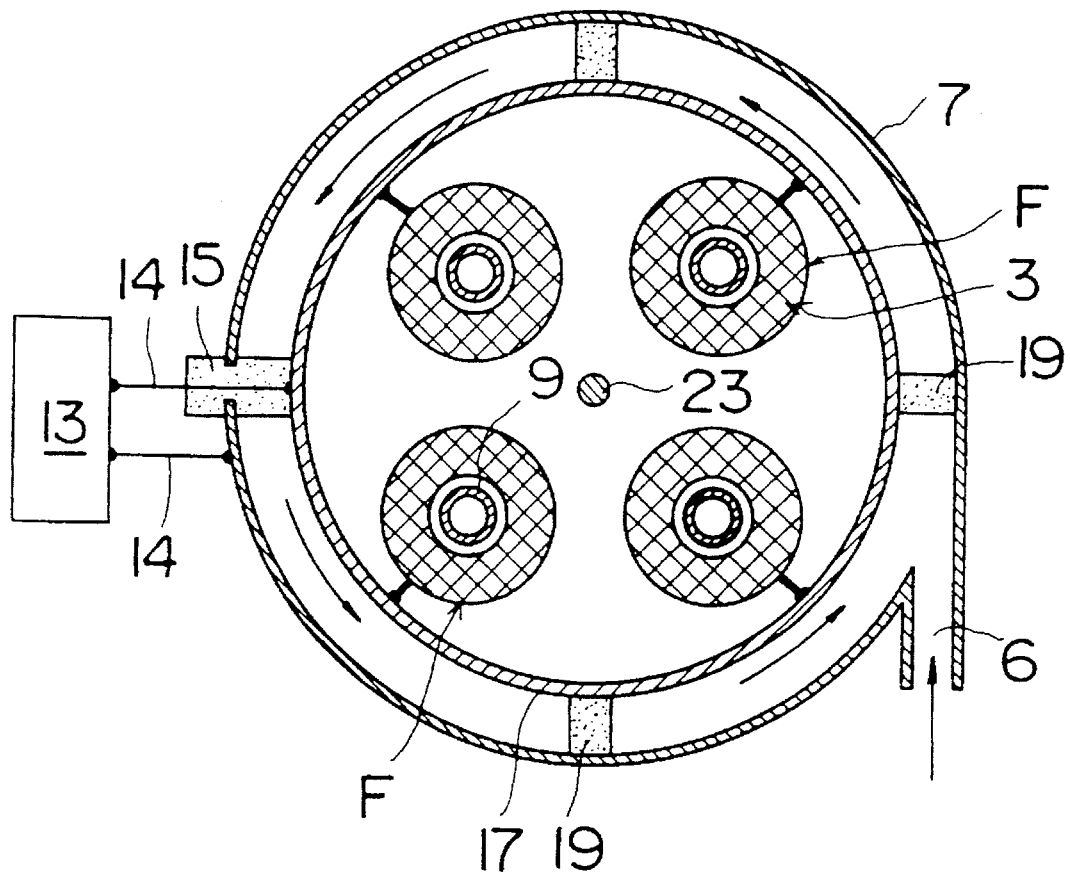
FIG. 17 is a horizontal cross section of a still other fluid-filtering device according to the invention.
Figure 18:
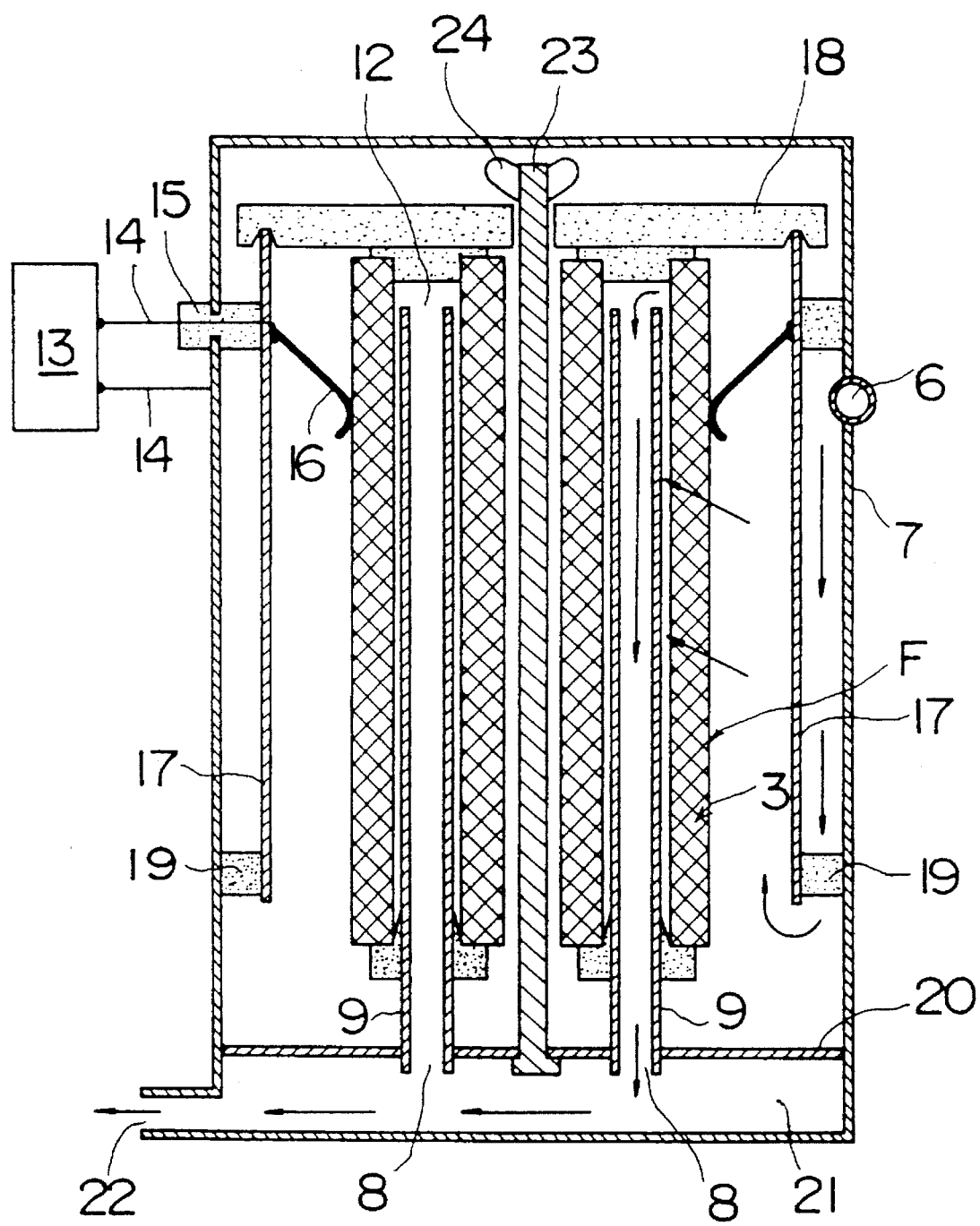
FIG. 18 is a vertical cross section of the fluid-filtering device shown in FIG. 17.

In each of the examples, only one filter element F is used. Plural filter elements F may be used. Referring to FIGS. 17 and 18, plural filter elements F are arranged radially. Correspondingly, plural central grounded electrodes 9 are disposed. The lower part of the space inside the outer cylinder 7 is partitioned by a partitioning plate 20 to form a collection space 21. The discharge ports 8 at the lower ends of the grounded electrodes 9 are placed in communication with the collection space 21. The processed fluid is collected in the collection space 21 and expelled from the filtering device through a collection discharge port 22 that is in communication with the collection space 21. The filtering device of this structure is adapted to filter a large amount of liquid to be processed. A clamping rod 23 is used to tighten and fix the filter elements F. Indicated by 24 is a clamping screw.

Figure 19:
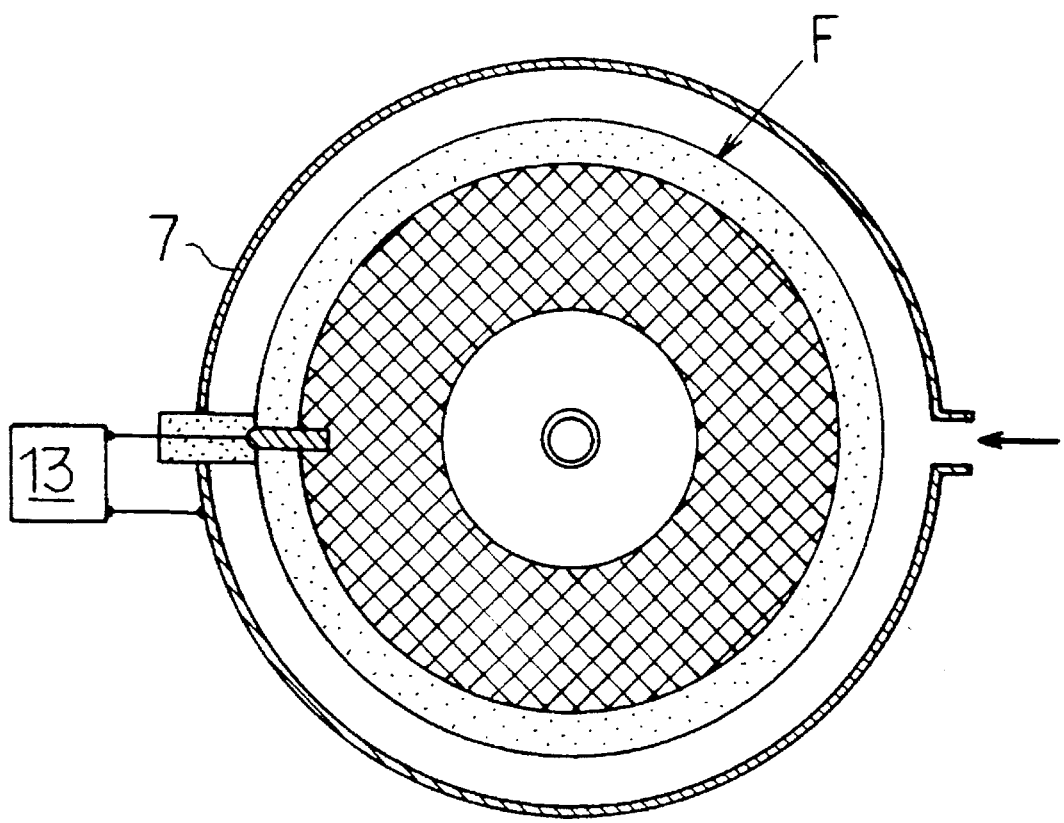
FIG. 19 is a horizontal cross section of a still yet fluid-filtering device according to the invention.
Figure 20:
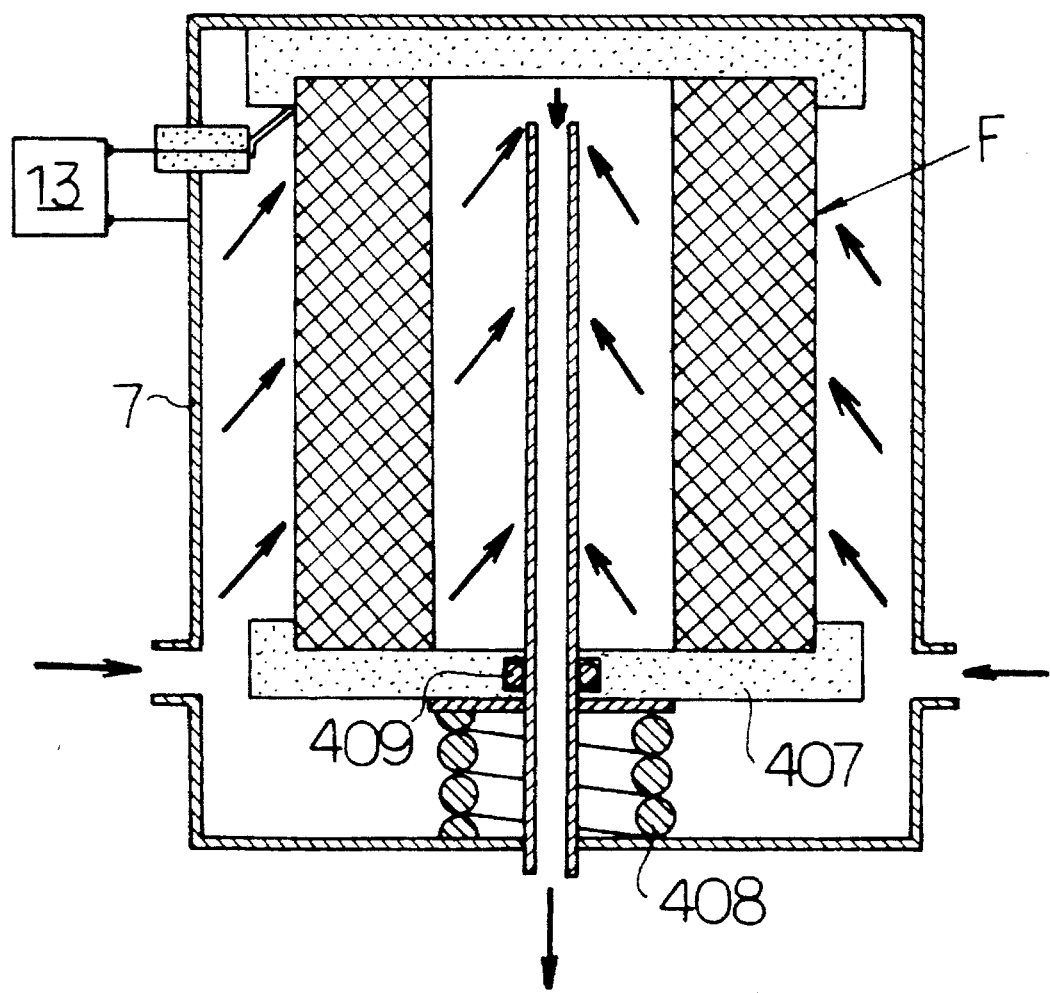
FIG. 20 is a vertical cross section of the fluid-filtering device shown in FIG. 19.

Referring to FIGS. 19 and 20, there is shown a filtering device using the filter element F shown in FIG. 8. This device is essentially identical in structure with the device shown in FIG. 12. This filtering device of FIGS. 19 and 20 has a filter support plate 407 made from an insulating resin. The support plate 407 holds the lower end surface of the filter element F. The support plate 407 is pushed upward by a shock-absorbing spring 408 to fix the filter element F. Indicated by 409 is an O ring used for sealing purposes. The arrows indicate the directions of flow of fluid.

Figure 21:
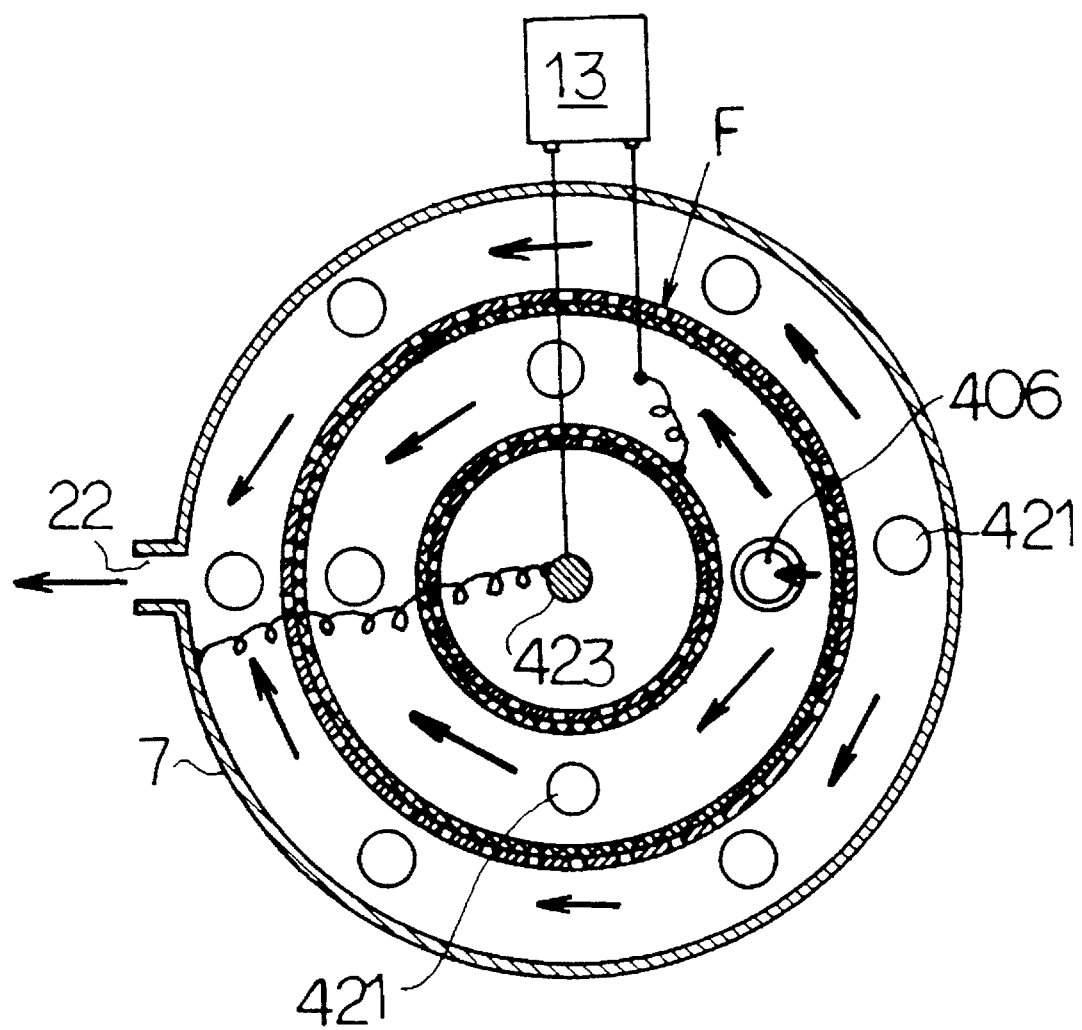
FIG. 21 is a horizontal cross section of a still further fluid-filtering device according to the invention.
Figure 22:
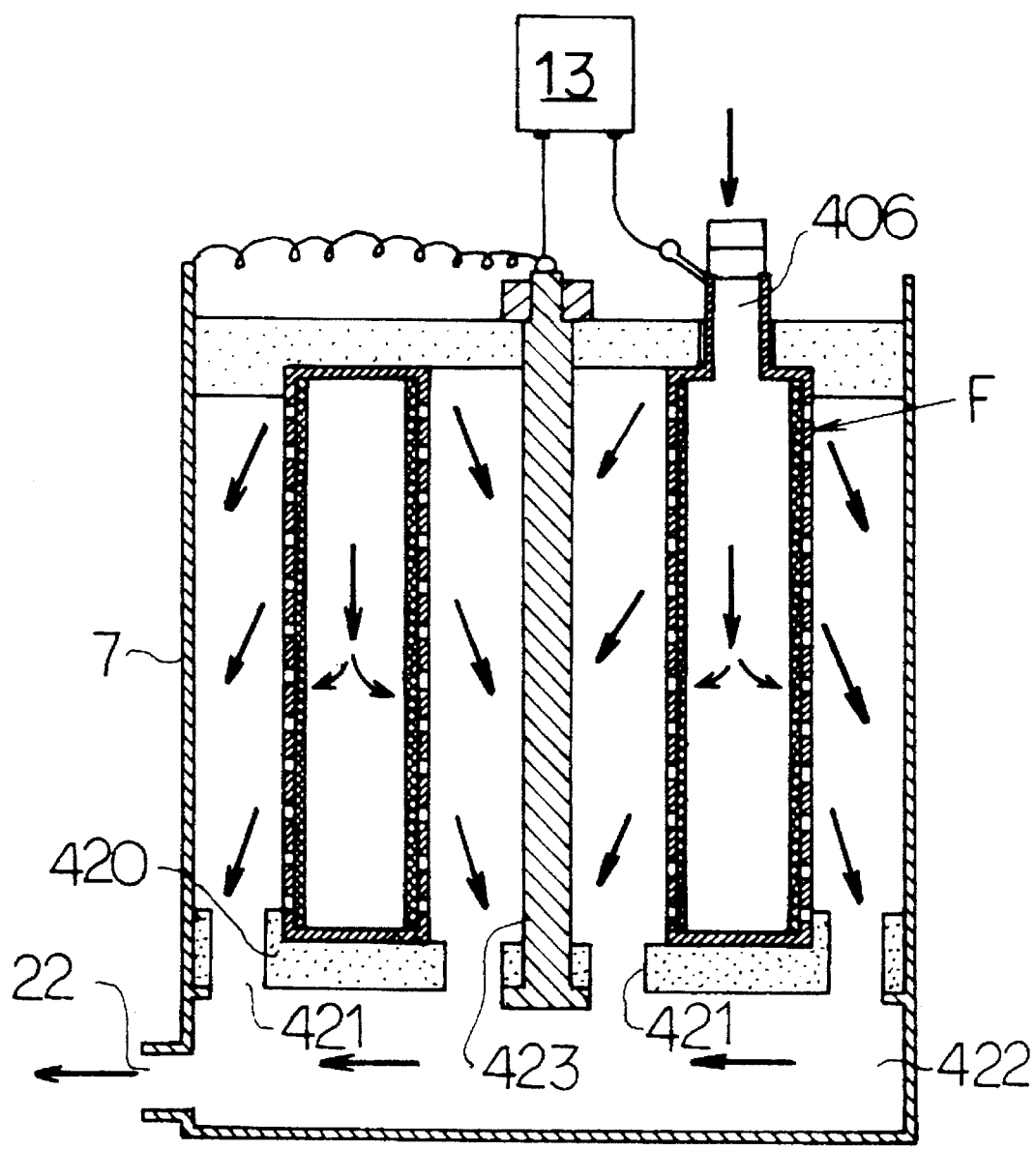
FIG. 22 is a vertical cross section of the fluid-filtering device shown in FIG. 21.

Referring to FIGS. 21 and 22, there is shown a filtering device incorporating the filter element F shown in FIG. 10, the element F taking the form of a hollow container. In this example, a contaminated fluid is introduced into the space inside the filter element F from an entrance port 406 formed at the upper end surface of the element F. The fluid then passes through an inner filtering layer 404, and goes out of the element F through the holes formed in an inner cylinder 402. Alternatively, the fluid passes through an outer filtering layer 403 and then goes out of the element F through the holes formed in an outer cylinder 401. The filtered fluid from the filter element F flows into a filtered fluid collection space 422 through discharge openings 421 formed in a filter support plate 420 made from an insulating resin. The support plate 420 supports the lower surface of the element F. The openings 420 are regularly spaced from each other. The fluid then passes through a collection discharge port 22 formed in the lower side wall of the outer cylinder 7 and is expelled from the filtering device. The filter element F is easily mounted in the filtering device with a clamp bolt 423.

In this filtering device, the removed and coagulated particulates accumulate in the hollow space inside the filter element F. Clogging of the filtering layer can be detected by a vacuum gauge. If the pump pressure exceeds a given pressure, then the filtering layer is judged to have clogged. Thus, the element F is replaced. In the present example, the filter element F is fabricated as a package. The filter element which has been mounted in the body of the filtering device can be easily detached, because the element is tightened and fixed only with the clamp bolt 423.

In the present example, when the amount of deposited and coagulated particulates inside the filter element F increases to thereby decrease the performance of the filter, the performance can be regained simply by exchanging the element F. In addition, the detached element F can be discarded as it is. The present example is adapted for filtering of a contaminated fluid such as a machining oil or a machining liquid containing a large amount of powder. In the present example, coagulated particulates deposit only inside the filter element F; the particulates do not remain inside the body of the tank. Consequently, it is not necessary to clean the inside of the tank. Hence, the maintenance is easy to carry out.

In each of the examples described thus far, a cylindrical or coaxially cylindrically formed filter element is incorporated in a tank consisting of a cylindrical outer cylinder 7. The present invention can also be applied to tanks other than the cylindrical tank. Furthermore, the shape of the filter element is not restricted to the cylindrical form.

Figure 23:
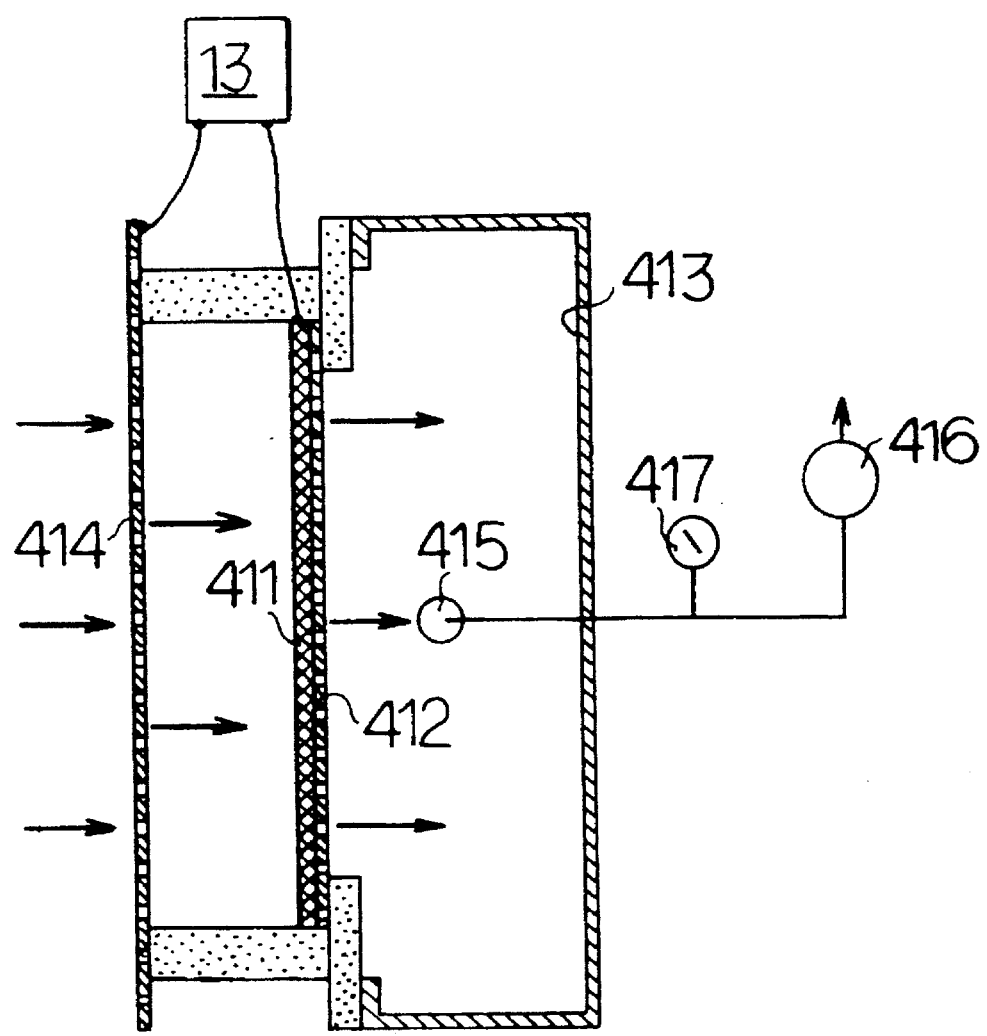
FIG. 23 is a horizontal end view of a filtering unit installed in a tank that has been already mounted.
Figure 24:
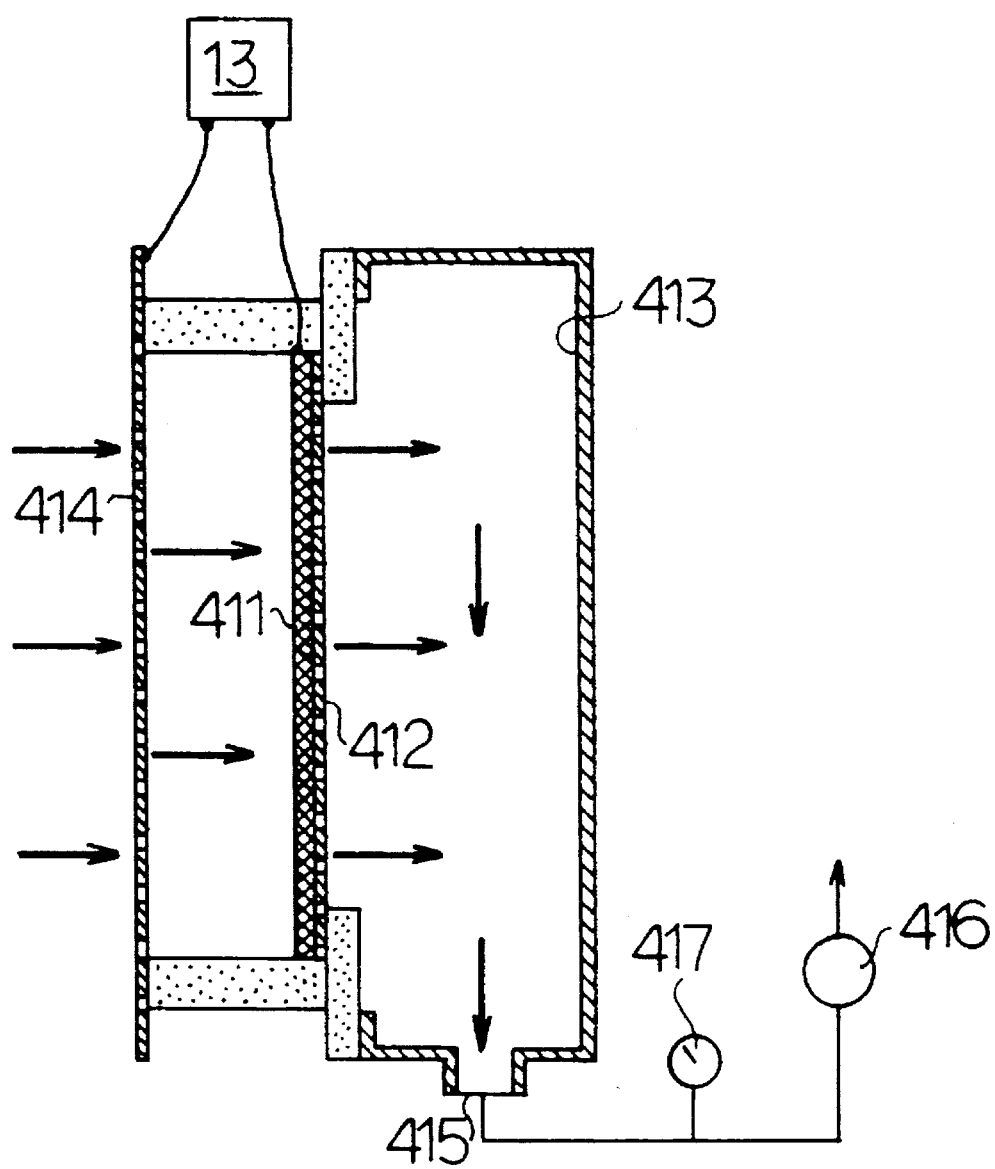
FIG. 24 is a vertical end view of the filter unit shown in FIG. 23.

Referring next to FIGS. 23 and 24, there is shown a unit filtering device which is intended to be mounted in a boxlike tank that has been already installed when the filtering device is used. This unit filtering device has a flat filtering layer 411 made of a conductive material and a porous plate 412 that supports the filtering layer. The filtering layer 411 acts also as an electrically charging electrode. The filtering layer 411 and the porous plate 412 are stacked on top of each other and mounted on one side wall of a closed tank 413 for attracting a fluid. A porous metallic plate 414 serving as a grounded electrode is disposed remote from the flat filtering layer 411. This unit filtering device is mounted in a previously mounted tank and used.

After the unit filtering device has been mounted in the tank which has been previously installed, if the fluid inside the closed tank 413 is sucked from a suction port 415 that is formed to draw filtered fluid, then the fluid moves in the direction indicated by the arrows inside the filtering device, thus filtering out the particulates in the fluid. In particular, the contaminated fluid inside the tank passes through the porous metallic plate 414 and then passes through the flat filtering layer 411 acting also as a charging electrode, whereby the particulates in the fluid are removed. The filtered fluid introduced in the closed tank 413 is discharged to the outside via the suction port 415. The fluid is drawn by a suction pump 416. The suction pressure is monitored with a vacuum gauge 417.

This device can be mounted in a tank already installed, the upper surface of the tank being open. The filtering device can be built without wasting a previously installed tank. Therefore, a filtering device can be offered economically. Furthermore, the space can be saved, because a tank dedicated to the filtering device is not needed. In addition, coagulated particulates deposit at the bottom of the tank whose upper surface is open and so the device is easy to clean. Moreover, the maintenance of the device is easy to carry out.

In the present example, the filtered fluid is sucked by a pump and, therefore, the pump does not wear away quickly. Additionally, it is easy to maintain the required degree of vacuum. The pump will break down infrequently.

In one embodiment of the invention, an electrically charging electrode made of a conductive material and acting also as a filtering layer is disposed in a passage through which a fluid containing particulates to be filtered pass, together with a counter electrode disposed opposite to the charging electrode. A DC voltage, an AC voltage, or a combination thereof is applied between the charging electrode and the counter electrode.

In another embodiment of the invention, the filtering layer of a filter element consists entirely of a porous conductive material having numerous voids that pass fluid. In a further embodiment of the invention, a filter element has a plurality of filtering layers made of a conductive material.

In these embodiments of the invention, all of or a considerable portion of the filter element can be electrically charged. The electric field can be made to directly act radially deep into the filter element. In even deep portions of the filter, impurity particulates can be caught efficiently. During the whole process of the filtering action, a strong Coulomb force acts on the fluid passing through the filter at all times to draw the impurity in the fluid. The attracting force is due to the Coulomb force and is quite strong. Therefore, even impurity particulates which are much smaller than the meshes such as coloring matter particles can be caught with a high efficiency. Also, the meshes much larger than the sizes of the impurity particles can be adopted. Hence, a long-lived filtering device which does not clog after a long continuous use can be obtained. In addition, a large amount of fluid can be processed, because the meshes are large.

Microscopic impurity particles are directly attracted by a Coulomb force. Simultaneously, impurity particles are coagulated and made coarser by the action of the electric field. This enhances the efficiency at which impurity particulates are caught.

Where a filter taking the form of a hollow container is fabricated by arranging a conductive material coaxially, the filter is designed to be detachable, and the filter is used as a filtering layer acting also as an electrically charging electrode, the following advantages can be had. The removed, coagulated particulates deposit in the space inside the filter element. If the amount of deposited particulates increases to thereby deteriorate the performance of the filter, the performance can be regained simply by exchanging the filter element. In addition, the removed filter element F can be discarded as it is. Therefore, the device is adapted for filtering of a contaminated fluid such as a machining oil or a machining liquid containing a large amount of powder produced by a machining operation. The coagulated particulates deposit only inside the filter element; they do not remain in the body of the tank. This makes it unnecessary to clean the inside of the tank. Also, the maintenance is easy to carry out.

Where a flat filter made of a conductive material is used as a filtering layer acting also as a charging electrode and this filtering layer is immersed in the liquid in a tank previously installed, a filtering device can be constructed without wasting the previously installed tank. Therefore, a filtering device can be offered at low cost. Furthermore, a separate tank dedicated to the filter device is not needed. This saves the space occupied.

Where the filtering layer acting also as the charging electrode is made of a conductive material having a large surface area such as carbon fibers and activated carbon, all the microscopic fibers existing close together can contribute to the function of the charging electrode and so impurity particulates in a processed fluid can be caught efficiently. Further, a large amount of fluid can be processed efficiently, because substantially innumerable spaces passing the fluid are present between the fibers.

What is claimed is:

1. A fluid-filtering device comprising:

an outer cylinder having an entrance port through which a fluid to be filtered is introduced;

a central grounded electrode taking the form of a pipe, the electrode acting also as an outflow passage for filtered fluid, the central electrode having the same polarity as the outer cylinder;

a space formed between the outer cylinder and the central grounded electrode;

a cylindrical filter element having a filtering layer acting also as an electrically charging electrode, the filtering layer being made of a conductive material, the filter element being mounted in the space;

and means for supplying a voltage consisting of an AC voltage between the filter element, and each of the outer cylinder and the central grounded electrode according to the resistivity of the fluid so as to cause an attracting force and a repulsive force to alternately act on particulates in the fluid, wherein said voltage between the filter element and each of the outer cylinder and the central grounded electrode consists of an AC voltage.

2. The fluid-filtering device of claim 1, wherein said means for supplying a voltage is capable of supplying an AC voltage of 0.1 to 5000 V/cm.

3. A filter device according to claim 1, wherein said filter element comprises:

at least two first cylindrical filtering layers made of a conductive material having numerous voids for passing the fluid;

at least one second cylindrical filtering layer consisting of a dielectric material or an adsorbent and alternating with the two first filtering layers;

an upper sealing insulating packing member and a lower sealing insulating packing member which close upper and lower ends, respectively, of the first and second filtering layers.

4. The filter element of claim 3, wherein the conductive material of the first filtering layers is a conductive material having a large surface area selected from the group consisting of carbon fibers and activated carbon.

5. The filter element of claim 4, wherein the first filtering layers are formed by winding cords of carbon fibers on a bobbin or by winding cloth of carbon fibers in plural layers.

* * * * *